United States Patent
Chaubey et al.

(10) Patent No.: US 10,924,458 B2
(45) Date of Patent: Feb. 16, 2021

(54) GENERATING AN APPLICATION-BASED PROXY AUTO CONFIGURATION

(71) Applicant: Juniper Networks, Inc., Sunnyvale, CA (US)

(72) Inventors: Rajeev Chaubey, Bangalore (IN); Ashok Kumar, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 130 days.

(21) Appl. No.: 16/202,513

(22) Filed: Nov. 28, 2018

(65) Prior Publication Data
US 2020/0169535 A1   May 28, 2020

(51) Int. Cl.
*H04L 29/06* (2006.01)
*H04L 29/08* (2006.01)

(52) U.S. Cl.
CPC .......... *H04L 63/0281* (2013.01); *H04L 63/20* (2013.01); *H04L 67/02* (2013.01); *H04L 67/28* (2013.01); *H04L 67/42* (2013.01)

(58) Field of Classification Search
CPC . H04L 63/02; H04L 63/0227; H04L 63/0236; H04L 63/0272; H04L 63/0281; H04L 63/029; H04L 63/20; H04L 67/28; H04L 67/42
See application file for complete search history.

(56) References Cited

U.S. PATENT DOCUMENTS

| | | |
|---|---|---|
| 9,049,128 B1 | 6/2015 | Narayanaswamy et al. |
| 9,077,688 B2 | 7/2015 | Amit et al. |
| 2004/0006615 A1 | 1/2004 | Jackson |
| 2005/0138604 A1 | 6/2005 | Harrison |
| 2007/0242619 A1* | 10/2007 | Murakami ............ H04W 48/18 370/252 |
| 2008/0109871 A1* | 5/2008 | Jacobs .................... H04L 63/20 726/1 |
| 2011/0231479 A1 | 9/2011 | Boydstun et al. |
| 2013/0005296 A1* | 1/2013 | Papakostas ........... H04W 24/00 455/405 |
| 2013/0031595 A1* | 1/2013 | Nevstruev ........... G06F 21/6245 726/1 |
| 2013/0340031 A1* | 12/2013 | Amit ................. H04W 12/0027 726/1 |
| 2014/0137184 A1* | 5/2014 | Russello ................. H04L 63/20 726/1 |
| 2017/0126534 A1* | 5/2017 | Cimino ............... H04L 67/2814 |

OTHER PUBLICATIONS

Extended European Search Report for Application No. EP19180769.2, dated Nov. 26, 2019, 9 pages.

* cited by examiner

*Primary Examiner* — Malcolm Cribbs
(74) *Attorney, Agent, or Firm* — Harrity & Harrity, LLP

(57) ABSTRACT

A network device may identify an application signature associated with a web application, and may determine, based on an application-based policy associated with the web application, an access method to be used to transmit traffic associated with the web application. The network device may generate a proxy auto configuration (PAC) file using the application signature associated with the web application, and the access method to be used to transmit the traffic associated with the web application. The network device may provide the PAC file to a client device to permit the client device to transmit the traffic associated with the web application based on the PAC file.

20 Claims, 15 Drawing Sheets

```
Application 1 {
    rule 1 {
        protocol: HTTP
        cts-server-host-name: *.xyz.com
    }
    rule 2 {
        protocol: SSL/TLS
        cts-server-name-in-certificate:*.secure.xyz.com
    }
    rule 3 {
        protocol: HTTP
        client-user-agent:*some-agent*
    }
}
```

FIG. 2

```
function FindProxyForURL(url, host) {
    If ( shExpMatch(host, ("*.xyz.com") | ("*.secure.xyz.com"))
        { // Application 1 Direct
            return DIRECT
        }
    else if dnsResolve(host) == 192.0.2.5)
        { //Application 1 Application Cache (ASC) SYNC
            return DIRECT
        }
    else if ( shExpMatch(host, ("*.abc.com") | ("*.secure.abc.com"))
        { // Application 2 through Proxy
            return PROXY proxy1.example.com:9000
        }
    else
        { // Default case. IPS-Proxy Providing Intrusion Protection Services
            PROXY proxy2.example.com:8080
        }
}
```

FIG. 3

GENERATING AN APPLICATION-BASED PROXY AUTO CONFIGURATION

BACKGROUND

A proxy auto configuration (PAC) file may configure a client device to use a particular access method to transmit traffic to, and/or receive traffic from, a server device. Examples of access methods include transmitting and/or receiving traffic via a proxy server device, transmitting and/or receiving traffic without using a proxy server device (e.g., by communicating directly with the server device), and/or the like.

SUMMARY

According to some implementations, a network device may include one or more memories, and one or more processors communicatively coupled to the one or more memories, to identify an application signature associated with a web application, and to determine, based on an application-based policy associated with the web application, an access method to be used to transmit traffic associated with the web application. The one or more processors may generate a proxy auto configuration (PAC) file using the application signature associated with the web application, and the access method to be used to transmit the traffic associated with the web application. The one or more processors may provide the PAC file to a client device in order to permit the client device to transmit the traffic associated with the web application based on the PAC file.

According to some implementations, a non-transitory computer-readable medium may store one or more instructions that, when executed by one or more processors of a network device, cause the one or more processors to identify an application signature associated with a web application, and to determine, based on an application-based policy associated with the web application, an access method to be used to transmit traffic associated with the web application. The one or more instructions may cause the one or more processors to generate a proxy auto configuration (PAC) file using the application signature associated with the web application, and the access method to be used to transmit the traffic associated with the web application. The one or more instructions may cause the one or more processors to associate the PAC file with a uniform resource locator (URL), and to provide the PAC file to a client device based on receiving a request, from the client device, that specifies the URL.

According to some implementations, a method may include identifying a plurality of application signatures, wherein a respective application signature, of the plurality of application signatures, is associated with a respective web application of a plurality of web applications, and determining a plurality of access methods to be used to transmit traffic associated with the plurality of web applications, wherein a respective access method, of the plurality of access methods, is to be used to transmit traffic associated with the respective web application. The method may include generating a proxy auto configuration (PAC) file using each application signature of the plurality of application signatures, and the respective access method to be used to transmit traffic associated with the respective web application. The method may include providing the PAC file to a client device.

BRIEF DESCRIPTION OF THE DRAWINGS

FIG. 2 is a diagram of an example application signature.

FIG. 3 is a diagram of an example PAC file.

DETAILED DESCRIPTION

Figure 1A:
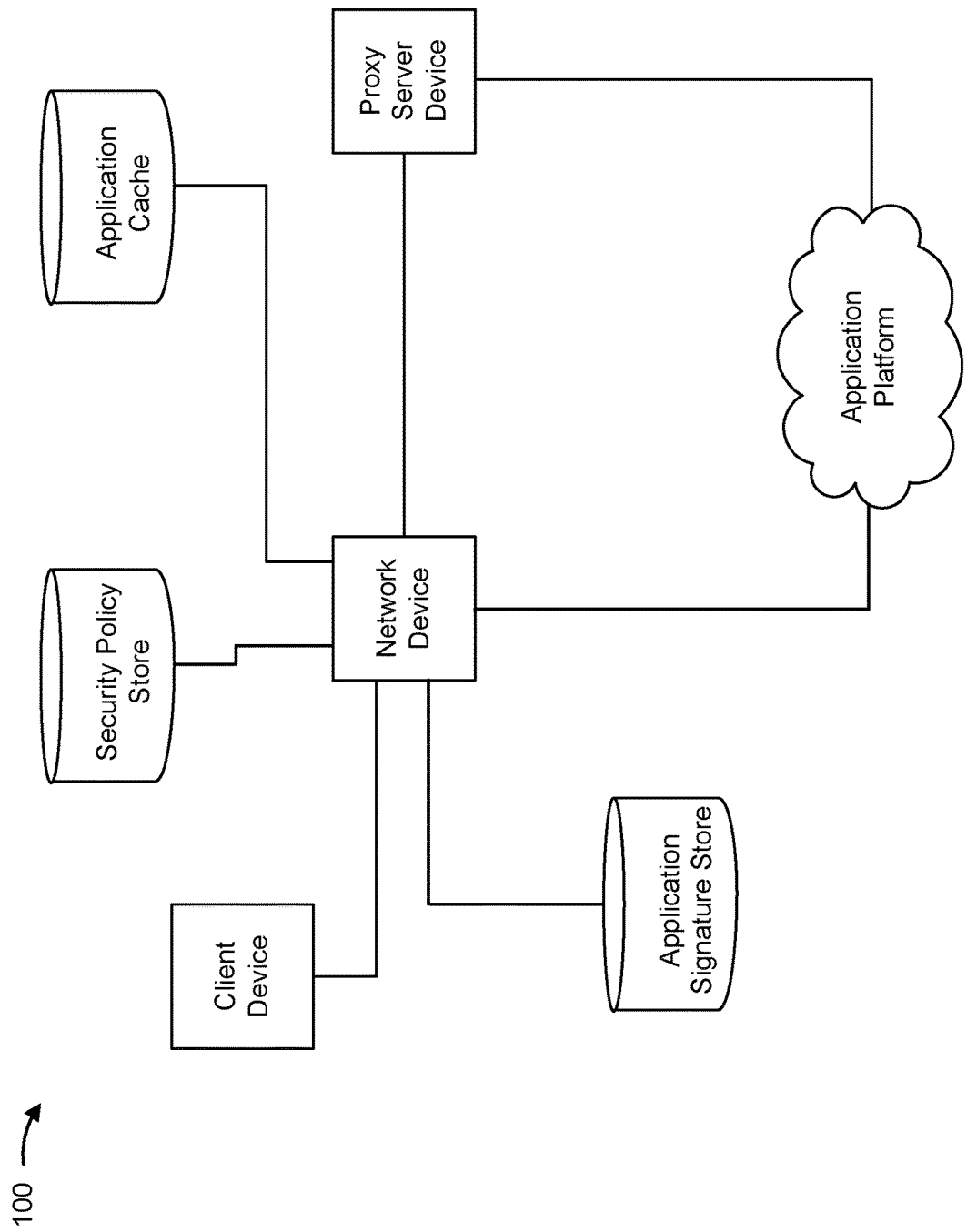
FIGS. 1A-1E are diagrams of an example implementation described herein.

The following detailed description of example implementations refers to the accompanying drawings. The same reference numbers in different drawings may identify the same or similar elements.

In some cases, an entity (e.g., an organization) may manually generate a PAC file that is to be used to configure one or more client devices that communicatively connect to a network associated with the entity. For example, a network administrator, information technology (IT) personnel, and/or the like, associated with the entity, may select one or more access methods that are to be used to transmit and/or receive traffic associated with one or more server devices, may incorporate the one or more access methods into a PAC file, and may provide the PAC file to the one or more client devices. However, generating PAC files is a cumbersome process that is prone to error (e.g., a PAC file may be generated with an incorrect proxy server address, a PAC file may be generated such that particular types of traffic are associated with an incorrect access method, and/or the like). Moreover, some PAC files may be generated with inflexible rules that cause all or a majority of traffic, that is transmitted and/or received by a client device, to be transmitted and/or received via a proxy server device. As the quantity of client devices connected to the entity's network increases, the proxy server device may become a bottleneck for some web application traffic (e.g., such as traffic associated with a web application that requires low latency and/or high bandwidth), which may cause an increase in latency between the client device and an application platform associated with the web application, which in turn may result in a degraded user experience of the web application, degraded quality of service of the web application, periodic disconnects between the client device and the application platform, increased traffic processing times at the proxy server device, dropped packets at the proxy server device, and/or the like.

Some implementations described herein provide a network device that is capable of automatically generating application-based PAC files. In some implementations, the network device may identify an application signature associated with a web application, and may determine, based on an application-based policy associated with the web application, an access method to be used to transmit traffic associated with the web application. The network device may generate a PAC file that includes information specifying an association between the application signature associated with the web application and the access method to be used to transmit the traffic associated with the web application. The network device may provide the PAC file to a client device to permit the client device to transmit the traffic associated with the web application based on the PAC file.

In this way, the network device may generate a PAC file that configures a client device to use various access methods for transmitting traffic associated with a plurality of different web applications. In this way, the PAC file may configure the client device to transmit traffic associated with a particular web application such that the traffic is transmitted using a proxy server device, and may configure the client device to transmit traffic associated with another web application such that the traffic associated with the other application is transmitted without using a proxy server device or using a different proxy server device, which enables application-specific traffic handling. Moreover, for traffic that is to be transmitted to an application platform without using a proxy server device, this decreases latency between a client device that is to transmit the traffic and the destination, which in turn improves user experience associated with the client device and the web application associated with the traffic. Moreover, permitting traffic associated with some web applications to be transmitted without using a proxy server device decreases the quantity of packets that is to be processed by the proxy server device, which decreases processing, memory, and networking resource usage of the proxy server device, reduces the time it takes to process traffic at the proxy server device (e.g., because the processing queue at the proxy server device is reduced), and allows the proxy server device to use the processing and/or memory resources of the proxy server device, that would have otherwise been used to process the traffic, for other purposes. In addition, the PAC file may be configured such that traffic associated with a particular web application may be transmitted to different proxy server devices, which may provide different types of value-added services related to logging, forensic auditing, and/or the like, which enables web applications requiring detailed logging to be routed to a particular proxy server. Further, the PAC file may be configured such that cost savings are realized due lowering the traffic on expensive leased lines/MPLS links that may be in use between the proxy server device and client devices.

FIGS. 1A-1E are diagrams of an example implementation 100 described herein. As shown in FIG. 1A, implementation 100 may include various devices, such as one or more client devices, a network device, one or more data stores (e.g., an application signature store, a security policy store, an application cache, and/or the like), a proxy server device, an application platform, and/or the like. The quantity and configuration of devices illustrated in implementation 100 is an example, and greater, fewer, and/or different configurations of devices may be included in implementation 100.

In some implementations, one or more components illustrated in implementation 100 may be included in one or more local networks. For example, the client device, network device, and data stores may be included in a first local network; the proxy server device, may be included in the first local network or a second local network, and/or the like. The one or more local networks may include various types of wired and/or wireless local area networks (LANs), such as a wired LAN, a wireless LAN (WLAN), a home network, an office network, a campus network, and/or the like. In some implementations, the one or more local networks may be associated with the same entity, such as an enterprise, corporation, government agency, educational institution, and/or the like. In some implementations, the one or more local networks may be associated with different offices, different locations, different networks, and/or the like, of the entity.

The network device may include various types of network devices that are capable of transmitting traffic to the application platform, capable of receiving traffic from the application platform, and/or the like. For example, the network device may receive traffic from the client device and may transmit the traffic to the application platform. As another example, the network device may receive traffic from the client device and may transmit the traffic to the application platform via the proxy server device.

The proxy server device may include various types of devices that are capable of functioning as an intermediary between the client device and the application platform. For example, the proxy server device may transmit, for the client device, traffic to the application platform, may transmit, for the application platform, traffic to the client device, and/or the like. In some implementations, the traffic may include web pages, electronic files, and/or any other type of electronic content. In some implementations, the traffic may include requests for electronic content, such as a hypertext transfer protocol (HTTP) request, a file transfer protocol (FTP) request, and/or the like, which may be further encapsulated using secure sockets layer (SSL) protocol, transport layer security (TLS) protocol, and/or the like, to provide secure transmission of the traffic.

In some implementations, the proxy server device may perform various security functions for traffic transmitted by, and traffic that is to be received by, the client device. For example, the proxy server device may include a threat detection and/or an intrusion detection proxy server device that analyzes traffic that is transmitted by the client device, and/or analyzes traffic that is to be received by the client device, to determine whether the client device exhibits malicious behavior, to determine whether another device to which the client device is communicating exhibits malicious behavior, and/or the like. As another example, the proxy server device may include a deep packet inspection proxy server device that performs deep packet inspection on traffic that is transmitted by the client device and/or traffic that is to be received by the client device. In this way, the proxy server device may apply and/or enforce network, data, and/or computer security policies on traffic that is transmitted by the client device and/or traffic that is to be received by the client device.

The data stores may store information associated with various web applications, such as a web-based productivity application (e.g., a word processing application, a spreadsheet application, an email application, etc.), a web-based client management application, a computer-aided design application, and/or the like. A web application may include a client-server application that exchanges data using web protocols such as HTTP/HTTP secure (HTTPS). The application platform may reside over the Internet/cloud and the client device may include a web browser or custom software that communicates with the application platform.

In some implementations, the application signature store may include information identifying an application signature associated with a web application (e.g., information that may be used by a network device to identify traffic that is associated with the web application). The application signature of a web application may include information identifying one or more host domains associated with the web application, one or more addresses associated with the web application (e.g., a source address associated with a device that originates traffic associated with the application, a destination address associated with a device that is the destination of the traffic associated with the application, a port identifier associated with the source and/or destination of the packets associated with the application, etc.), information identifying one or more communications protocols associated with the application (e.g., a communications protocol that the client device and/or the application platform may use to transmit and/or receive packets associated with the application), and/or the like. The application signature store may store an application signature, associated with a particular web application, in an electronic file (e.g., an extensible markup language (XML) file, a JavaScript Object Notation (JSON) file, etc.), in a database, and/or the like.

An example of an application signature is illustrated in FIG. 2, where the application signature for Application 1 includes information identifying three rules by which traffic associated with Application 1 may be identified. According to rule 1, traffic associated with Application 1 may be identified based on the traffic using HTTP and being destined for an application platform associated with the host domain xyz.com. According to rule 2, traffic associated with Application 1 may be identified based on the traffic using a secure sockets layer (SSL) protocol and/or a transport layer security (TLS) protocol, and being destined for an application platform associated with the host domain secure.xyz.com. According to rule 3, traffic associated with Application 1 may be identified based on the traffic using HTTP and being associated with a user agent sent by a client device identified in a HTTP header request.

Returning to FIG. 1A, in some implementations, the security policy store may store information identifying one or more application-based policies associated with a web application. For example, the one or more application-based policies may include a policy specifying an access method for traffic associated with the web application, a policy for quality of service (QoS) treatment of the traffic associated with the web application, a policy for inspection of the traffic associated with the application, a policy rule that specifies that the traffic associated with the application is to be rate limited, a policy rule that specifies that the traffic associated with the application is to be dropped, and/or the like.

In some implementations, once traffic has been identified as belonging to a particular web application based on a corresponding web application signature, the application cache may store network endpoint information, associated with the web application, so that signature rule matching for the traffic destined for the network endpoint may be avoided. In this way, since application signature matching may be a memory and/or processor intensive task, memory and/or processor resources of the network device may be conserved by reducing the amount of repetitive signature evaluation for traffic to same network endpoint.

In some implementations, the network endpoint information may include a destination Internet protocol (IP) address, a port name/number/identifier, a protocol used by the network endpoint, a virtual router identifier associated with the network endpoint, and/or a rule from the application signature store that identified web application. In some implementations, the application cache may have hundreds or thousands of entries for a particular web application Each entry may have different destination IP address, port identifier, and/or the like whereas the application signature store may include a single entry for the web application that associates the web application with rules to identify the web application.

Figure 1B:
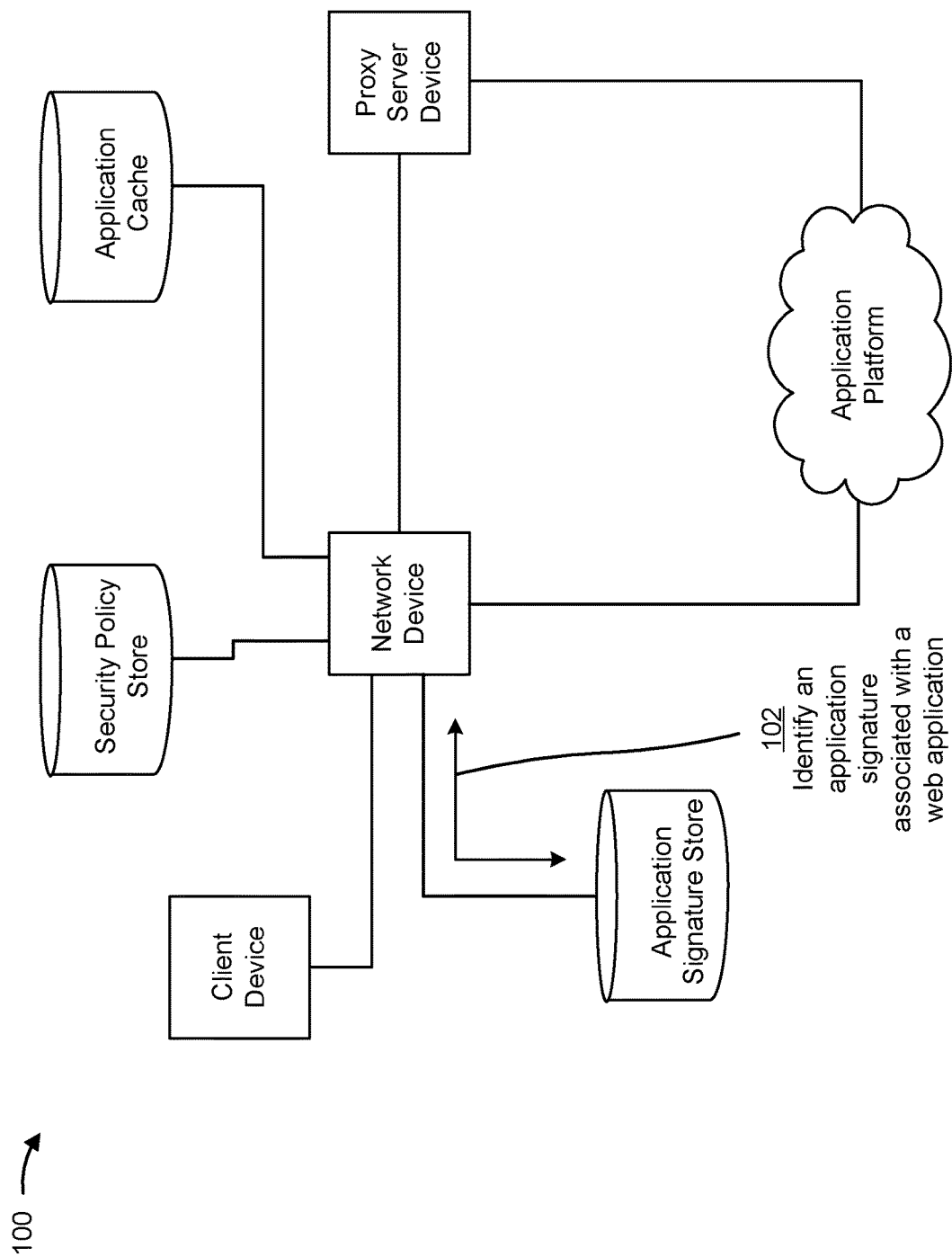

Turning to FIG. 1B, the network device may use the information stored in the application signature store, the information stored in the security policy store, and/or the information stored in the application cache to automatically generate and update PAC files. For example, the network device may automatically generate a PAC file based on determining that information associated with a web application has been added to the application signature store, the security policy store, and/or the application cache, based on determining that information associated with a web application has been updated in the application signature store, the security policy store, and/or the application cache, and/or the like. In some implementations, the network device may generate and update PAC files based on receiving an instruction (e.g., via input from a user, from another network device, and/or the like) to generate a PAC file, based on receiving an instruction to update a PAC file, and/or the like.

As shown in FIG. 1B, and by reference number 102, the network device may identify, based on the information stored in the application signature store, an application signature associated with a web application. For example, the network device may identify a database, an electronic file, and/or the like, stored in the application signature store, that includes the application signature associated with the web application. As explained above, the application signature, associated with the web application, may include information identifying a host domain associated with the web application, a protocol associated with the web application, a user agent associated with the web application, an address associated with the web application, and/or the like.

Figure 1C:
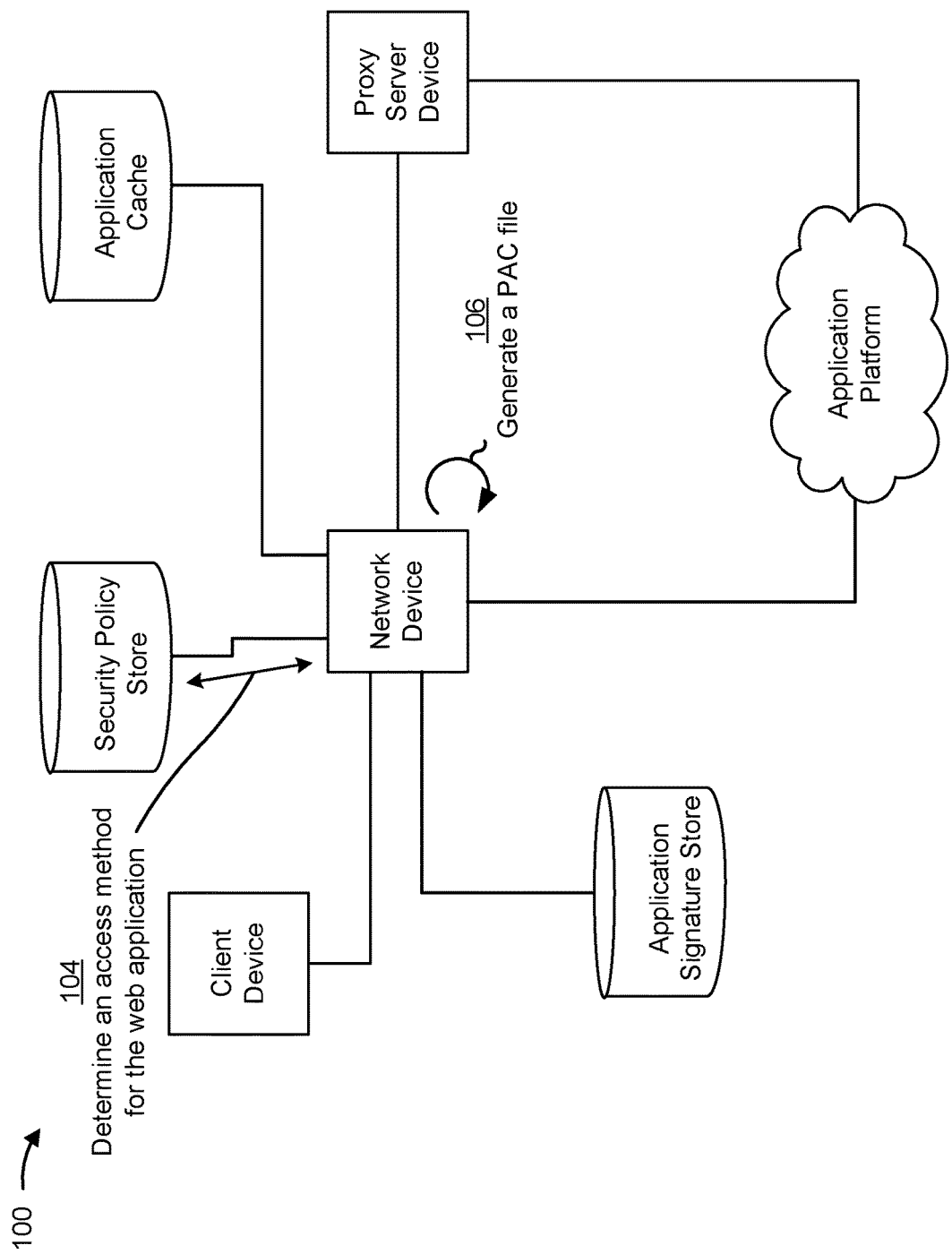

Turning to FIG. 1C, and as shown by reference number 104, the network device may identify an access method for the web application. For example, the network device may identify the access method based on the information, associated with the web application, stored in the security policy store. The information associated with the web application and stored in the security policy store may include an application-based policy that specifies an access method that is to be used to transmit and/or receive traffic associated with the web application. For example, the access method for the web application may specify that traffic associated with the web application is to be transmitted to the application platform via the proxy server device, may specify that traffic associated with the web application is to be transmitted to the application platform via another proxy server device, may specify that traffic associated with the web application is to be transmitted directly to the application platform (e.g., without transmitting the traffic to a proxy server device), and/or the like.

In some implementations, the access method that is to be used for traffic associated with the web application may be automatically selected (e.g., by another network device, by the proxy server device, and/or the like) based on various factors. For example, another device may automatically select the access method based on the web application being a particular type of web application (e.g., a productivity web application, a social media web application, and/or the like), based on usage information associated with the web application (e.g., a quantity of users associated with the entity that use the application, traffic volume of the web application in the entity, peak session and usage times associated with the application in the entity, and/or the like), based on latency requirements for the web application, and/or the like. For example, another device may determine that the web application is a video conferencing application that requires low latency, and therefore may select an access method for the web application that specifies traffic associated with the application is to be transmitted directly to the application platform (e.g., without transmitting the traffic via the proxy server device) in order to decrease the latency associated with the web application. As another example, another device may determine that the web application has a particular peak usage time, and may select an access method for the web application that specifies that traffic associated with the web application is to be transmitted to the application platform via the proxy server device except during the peak usage time, where the traffic may be transmitted to the application platform without using the proxy server device.

As further shown in FIG. 1C, and by reference number 106, the network device may generate the PAC file. In some implementations, the PAC file may include information specifying an association between the application signature of the web application and the access method that is to be used for traffic associated with the web application, information specifying an association between the network endpoint information associated with the application in the application cache and the access method that is to be used for the traffic associated with the web application, and/or the like. In this way, the client device, when configured by the PAC file, may identify, based on the application signature included in the PAC file, traffic associated with the web application, and may identify the access method that is to be used for traffic associated with the web application.

In some implementations, the PAC file may include information associated with a plurality of web applications. For example, the PAC file may include information specifying an association between an application signature of a first web application and an access method for the first web application, may include information specifying an association between an application signature of a second web application and an access method for the second web application, and/or the like. In some implementations, the access methods for different web applications may be the same access method, may be different access methods, and/or the like. In some implementations, the PAC file may further include a default access method that is to be used for traffic that is not associated with any web application that is identified in the PAC file.

An example of a PAC file is illustrated in FIG. 3. As shown in FIG. 3, the example PAC file includes information specifying an association between an application signature of a first web application (e.g., Application 1) and an access method for the first web application (e.g., an association that specifies that traffic associated with the host domains xyz.com and secure.xyz.com is to be transmitted directly to the application platform associated with Application 1). Moreover, the example PAC file includes information specifying an association between an IP/pattern-based rule identified for the first web application in the application signature store, a network endpoint associated with the IP/pattern-based rule identified for the first web application that is identified in the application cache, and the access method for the first web application), which may by dynamically generated as patterns for the network endpoint are identified. Moreover, the example PAC file includes information specifying an association between an application signature (which may be structured similarly to the application signature illustrated in FIG. 2) of a second web application (e.g., Application 2) and an access method for the second web application (e.g., an association that specifies that traffic associated with the host domains abc.com and secure.abc.com is to be transmitted to the application platform associated with Application 2 via a proxy server device), and includes information specifying a default access method (e.g., transmitting traffic that is not associated with Application 1 or Application 2 via another proxy server device).

Figure 1D:
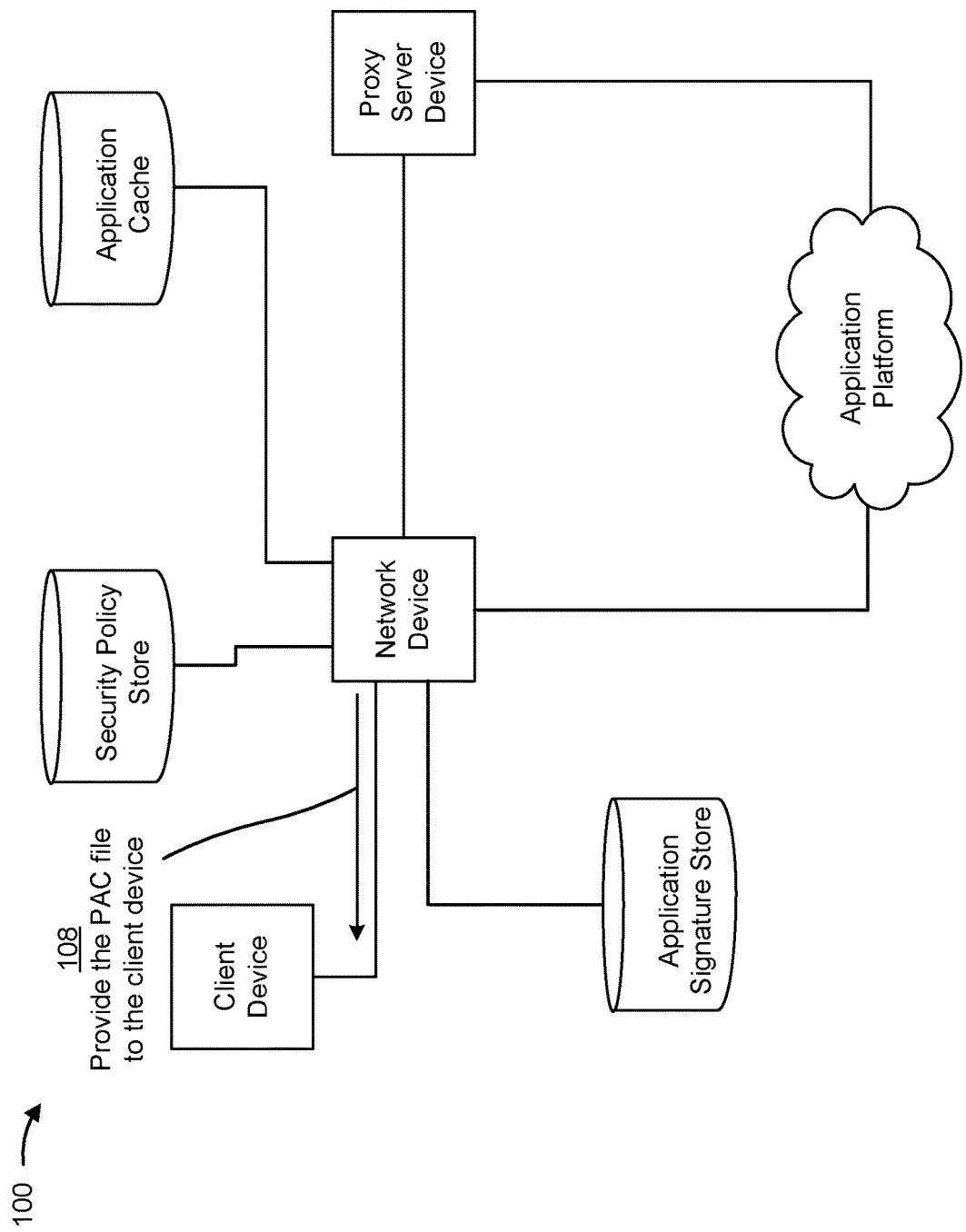

Turning to FIG. 1D, and as shown by reference number 108, the network device may provide the PAC file to the client device. In some implementations, the network device may automatically provide the PAC file to the client device based on generating the PAC file, based on updating the PAC file, and/or the like. In this way, the client device automatically receives the most up-to-date PAC files when new and/or updated PAC files become available. In some implementations, the network device may provide the PAC file to the client device based on receiving, from the client device, a request for the PAC file. For example, the network device may function as a PAC file server, and accordingly may associate the PAC file with an address (e.g., a uniform resource identifier (URI), a uniform resource locator (URL), and/or the like) and host the PAC file at the address. In this way, the client device may provide the request in the form of an HTTP request that identifies the address, an FTP request that identifies the address, and/or the like, and the network device may provide the PAC file to the client device based on receiving the request. In some implementations, the network device may provide the PAC file to another device that functions as a PAC file server, and the client device may request the PAC file from the other PAC file server.

Figure 1E:
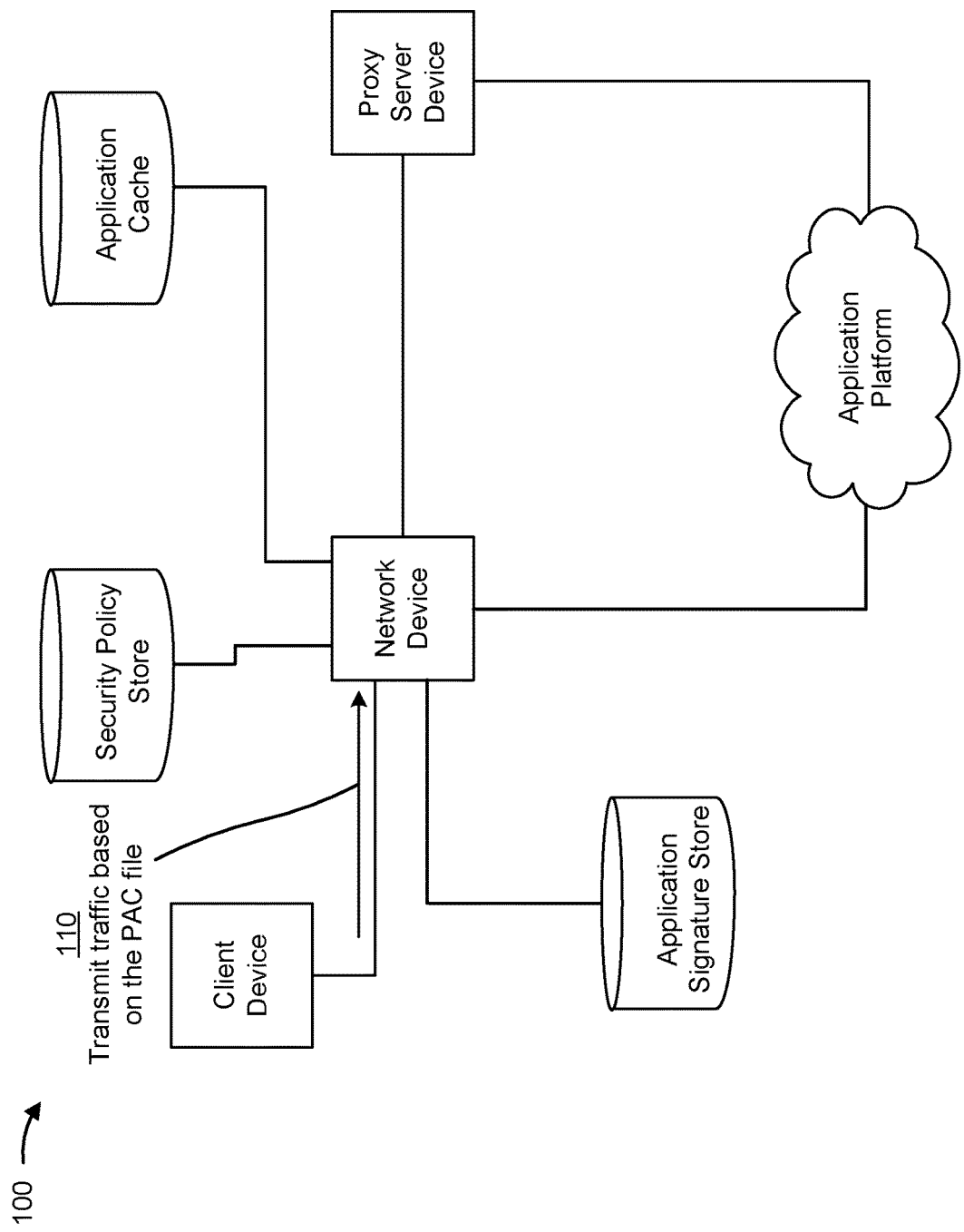

Turning to FIG. 1E, and as shown by reference number 110, the client device may receive the PAC file and may configure, based on the PAC file, the client device to transmit traffic to the application platform. For example, the client device may receive an instruction (e.g., via a web browser application on the client device) to transmit a request for a web page, a file, and/or the like, to the application platform, and the client device may determine, based on the information included in the PAC file, whether to transmit the request to the application platform via the proxy server device or to transmit the request directly to the application platform (e.g., without transmitting the request via the proxy server device). In this way, the client device may analyze the request to determine a host domain associated with the request, may determine an access method associated with the request based on an association of the host domain and the access method specified in the PAC file, and may transmit the request based on the access method.

In this way, the network device may generate and/or update a PAC file that configures the client device to use various access methods for transmitting traffic associated with a plurality of different web applications. In this way, the PAC file may configure the client device to transmit traffic associated with a particular web application such that the traffic is transmitted using a proxy server device, and may configure the client device to transmit traffic associated with another web application such that the traffic associated with the other application is transmitted without using a proxy server device, which increases the flexibility of generating PAC files. Moreover, for traffic that is to be transmitted to an application platform without using a proxy server device, this decreases latency between a client device that is to transmit the traffic and the destination, which in turn improves a user experience associated with the client device and the web application associated with the traffic. Moreover, permitting traffic associated with some web applications to be transmitted without using a proxy server device decreases the quantity of packets that is to be processed by the proxy server device, which decreases processing, memory, and networking resource usage of the proxy server device, reduces the time it takes to process traffic at the proxy server device (e.g., because the processing queue at the proxy server device is reduced), and allows the proxy server device to use the processing and/or memory resources of the proxy server device, that would have otherwise been used to process the traffic, for other purposes.

As indicated above, FIGS. 1A-1E are provided merely as an example. Other examples may differ from what is described with regard to FIGS. 1A-1E.

Figure 4:
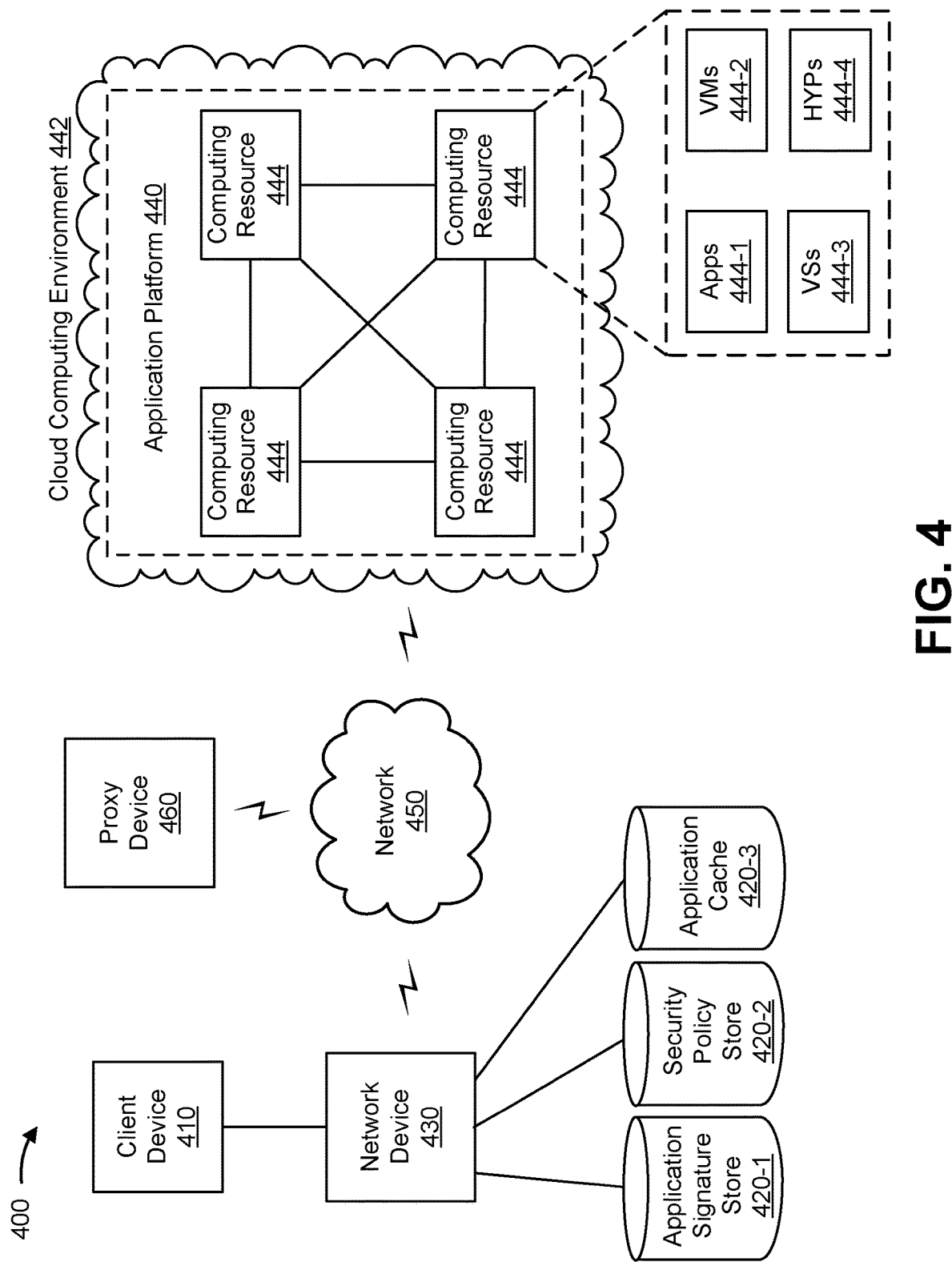
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 410, a plurality of data store devices 420 (e.g., an application signature store 420-1, a security policy store 420-2, an application cache 430-3 and/or the like, collectively referred to as "data store devices 420" and individually as "data store device 420"), a network device 430, an application platform 440 in a cloud computing environment 442 that includes a set of computing resources 444, a network 450, a proxy server device 460, and/or the like. Devices of environment 400 may interconnect via wired connections, wireless connections, or a combination of wired and wireless connections.

Client device 410 includes one or more devices capable of receiving, generating, storing, processing, and/or providing data associated with generating an application-based proxy auto configuration. For example, client device 410 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, and/or a similar type of device. Client device 410 may receive a PAC file from network device 430, may transmit traffic based on the PAC file to network device 430, and/or the like.

Data store device 420 includes one or more devices, such as storage device, a memory device, and/or the like, capable of receiving, generating, storing, processing, and/or providing data associated with generating an application-based proxy auto configuration. For example, application signature store 420-1 may include a storage device, a memory device, and/or the like that stores information associated with one or more applications, such as information associated with various web applications (e.g., a web-based productivity application or client management application, a computer-aided design application, and/or the like). For example, signature store 420-1 may store information identifying the web application, information identifying an application signature associated with the web application (e.g., information identifying one or more host domains, addresses, and/or communications protocols associated with the application). Security policy store 420-2 may include a storage device, a memory device, and/or the like that stores information identifying one or more application-based policies associated with the web application.

In some implementations, data store devices 420 may be standalone devices, may be included in a network device (e.g., network device 430) or another device, and/or the like.

Network device 430 includes one or more devices capable of receiving, generating, storing, processing, and/or providing data associated with generating an application-based proxy auto configuration. In some implementations, network device 430 may include a firewall, a router, a gateway, a switch, a bridge, a wireless access point, a base station (e.g., eNodeB, NodeB, gNodeB, and/or the like), and/or the like. In some implementations, network device 430 may be implemented as a physical device implemented within a housing, such as a chassis. In some implementations, network device 430 may be implemented as a virtual device implemented by one or more computer devices of a cloud computing environment or a data center.

In some implementations, network device 430 may identify an application signature associated with a web application (e.g., based on information stored in data store devices 420), may generate a PAC file, may provide the PAC file to client device 410, may receive traffic from client device 410 based on the PAC file, and/or may update the PAC file.

Application platform 440 includes one or more devices capable of receiving, generating, storing, processing, and/or providing data associated with generating an application-based proxy auto configuration. For example, application platform 440 may include a server device (e.g., a host server, a web server, an application server, etc.), a data center device, and/or a similar device. Application platform 440 may receive a packet from network device 430, may store the packet, may transmit the packet to another location, may modify the packet, may transmit one or more packets to the client device, may analyze the packet, and/or the like. In some implementations, application platform 440 may be associated with an application, and may receive the application, traffic associated with the application, a packet associated with the application, and/or the like.

In some implementations, as shown, application platform 440 may be hosted in cloud computing environment 442. Notably, while implementations described herein describe application platform 440 as being hosted in cloud computing environment 442, in some implementations, application platform 440 may not be cloud-based (i.e., may be implemented outside of a cloud computing environment) or may be partially cloud-based.

Cloud computing environment 442 includes an environment that hosts application platform 440. Cloud computing environment 442 may provide computation, software, data access, storage, and/or other services. As shown, cloud computing environment 442 may include a group of computing resources 444 (referred to collectively as "computing resources 444" and individually as "computing resource 444").

Computing resource 444 includes one or more personal computers, workstation computers, server devices, or another type of computation and/or communication device. In some implementations, computing resource 444 may host application platform 440. The cloud resources may include compute instances executing in computing resource 444, storage devices provided in computing resource 444, data transfer devices provided by computing resource 444, etc. In some implementations, computing resource 444 may communicate with other computing resources 444 via wired connections, wireless connections, or a combination of wired and wireless connections.

As further shown in FIG. 4, computing resource 444 may include a group of cloud resources, such as one or more applications ("APPs") 444-1, one or more virtual machines ("VMs") 444-2, one or more virtualized storages ("VSs") 444-3, and/or one or more hypervisors ("HYPs") 444-4.

Application 444-1 includes one or more software applications that may be provided to or accessed by one or more devices of environment 400. Application 444-1 may eliminate a need to install and execute the software applications on devices of environment 400. For example, application 444-1 may include software associated with application platform 440 and/or any other software capable of being provided via cloud computing environment 442. In some implementations, one application 444-1 may send/receive information to/from one or more other applications 444-1, via virtual machine 444-2. In some implementations, application 444-1 may include a software application associated with one or more databases and/or operating systems. For example, application 444-1 may include an enterprise application, a functional application, an analytics application, and/or the like.

Virtual machine 444-2 includes a software implementation of a machine (e.g., a computer) that executes programs like a physical machine. Virtual machine 444-2 may be either a system virtual machine or a process virtual machine, depending upon use and degree of correspondence to any real machine by virtual machine 444-2. A system virtual machine may provide a complete system platform that supports execution of a complete operating system ("OS"). A process virtual machine may execute a single program, and may support a single process. In some implementations, virtual machine 444-2 may execute on behalf of a user (e.g., a user of client device 410 and/or an operator of application platform 440), and may manage infrastructure of cloud computing environment 442, such as data management, synchronization, or long-duration data transfers.

Virtualized storage 444-3 includes one or more storage systems and/or one or more devices that use virtualization techniques within the storage systems or devices of computing resource 444. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 444-4 provides hardware virtualization techniques that allow multiple operating systems (e.g., "guest operating systems") to execute concurrently on a host computer, such as computing resource 444. Hypervisor 444-4 may present a virtual operating platform to the guest operating systems, and may manage the execution of the guest operating systems. Multiple instances of a variety of operating systems may share virtualized hardware resources.

Network 450 includes one or more wired and/or wireless networks. For example, network 450 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Proxy server device 460 includes one or more physical and/or virtual devices capable of receiving, generating, storing, processing, and/or providing data associated with generating an application-based proxy auto configuration. In some implementations, proxy server device 460 may include a network device, a server device, a client device, and/or the like. In some implementations, proxy server device 460 may include various types of devices capable of functioning as an intermediary between client device 410 and application platform 440. For example, proxy server device 460 may transmit, for client device 410, traffic to application platform 440, may transmit, for application platform 440, traffic to client device 410, and/or the like. In some implementations, proxy server device 460 may perform various security functions for traffic transmitted by, and traffic that is to be received by, client device 410, such as threat detection and/or intrusion detection, deep packet inspection, and/or the like.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5A:
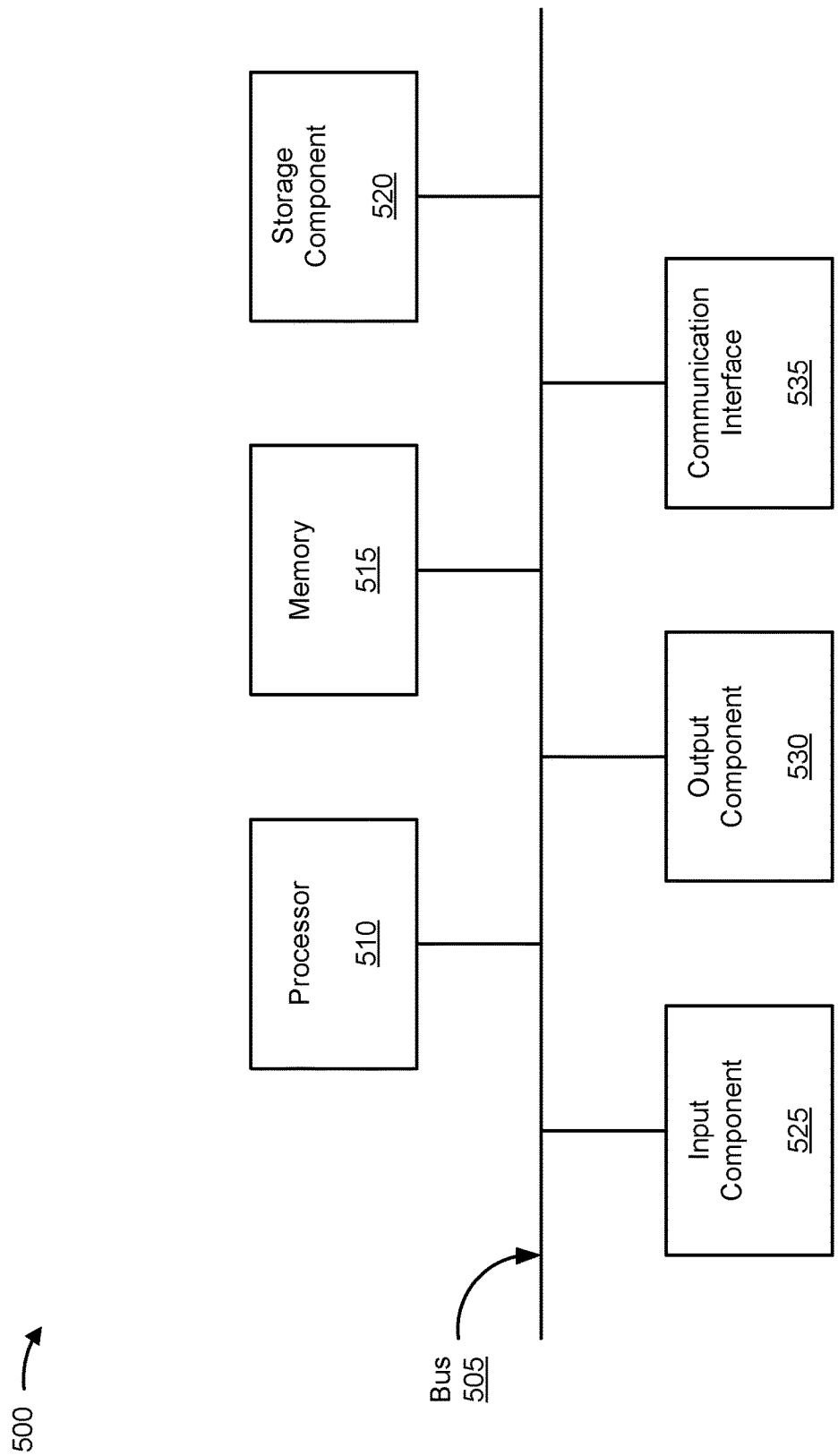
FIGS. 5A and 5B are diagrams of example components of one or more devices of FIG. 2.
Figure 5B:
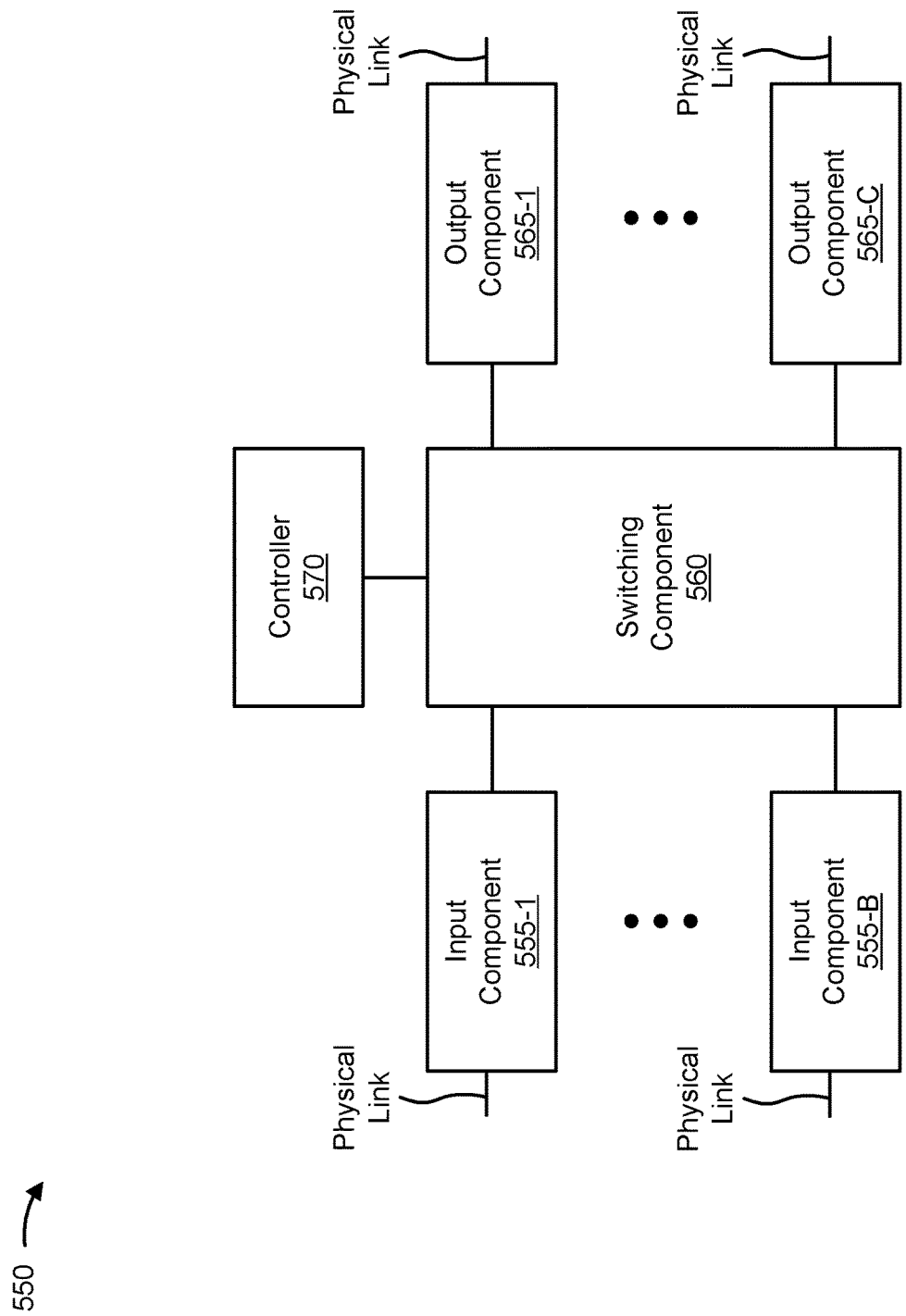

FIGS. 5A and 5B are diagrams of example components of one or more devices of FIG. 4. FIG. 5A is a diagram of example components of a device 500. Device 500 may correspond to client device 410, data store device 420, network device 430, application platform 440, proxy server device 460, and/or the like. In some implementations, client device 410, data store 420, network device 430, application platform 440, proxy server device 460, and/or the like, may include one or more devices 500 and/or one or more components of device 500. As shown in FIG. 5A, device 500 may include a bus 505, a processor 510, a memory 515, a storage component 520, an input component 525, an output component 530, and/or a communication interface 535.

Bus 505 includes a component that permits communication among multiple components of device 500. Processor 510 is implemented in hardware, firmware, and/or a combination of hardware and software. Processor 510 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 510 includes one or more processors capable of being programmed to perform a function. Memory 515 includes a random access memory (RAM), a read only memory (ROM), and/or another type of dynamic or static storage device (e.g., a flash memory, a magnetic memory, and/or an optical memory) that stores information and/or instructions for use by processor 510.

Storage component 520 stores information and/or software related to the operation and use of device 500. For example, storage component 520 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 525 includes a component that permits device 500 to receive information, such as via user input (e.g., a touch screen display, a keyboard, a keypad, a mouse, a button, a switch, and/or a microphone). Additionally, or alternatively, input component 525 may include a sensor for sensing information (e.g., a global positioning system (GPS) component, an accelerometer, a gyroscope, and/or an actuator). Output component 530 includes a component that provides output information from device 500 (e.g., a display, a speaker, and/or one or more light-emitting diodes (LEDs)).

Communication interface 535 includes a transceiver-like component (e.g., a transceiver and/or a separate receiver and transmitter) that enables device 500 to communicate with other devices, such as via a wired connection, a wireless connection, or a combination of wired and wireless connections. Communication interface 535 may permit device 500 to receive information from another device and/or provide information to another device. For example, communication interface 535 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 510 executing software instructions stored by a non-transitory computer-readable medium, such as memory 515 and/or storage component 520. A computer-readable medium is defined herein as a non-transitory memory device. A memory device includes memory space within a single physical storage device or memory space spread across multiple physical storage devices.

Software instructions may be read into memory 515 and/or storage component 520 from another computer-readable medium or from another device via communication interface 535. When executed, software instructions stored in memory 515 and/or storage component 520 may cause processor 510 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5A are provided as an example. In practice, device 500 may include additional components, fewer components, different components, or differently arranged components than those shown in FIG. 5A. Additionally, or alternatively, a set of components (e.g., one or more components) of device 500 may perform one or more functions described as being performed by another set of components of device 500.

FIG. 5B is a diagram of example components of a device 550. Device 550 may correspond to network device 430. In some implementations, network device 430 may include one or more devices 550 and/or one or more components of device 550. As shown in FIG. 5B, device 550 may include one or more input components 555-1 through 555-B (B≥1) (hereinafter referred to collectively as input components 555, and individually as input component 555), a switching component 560, one or more output components 565-1 through 565-C (C≥1) (hereinafter referred to collectively as output components 565, and individually as output component 565), and a controller 570.

Input component 555 may be points of attachment for physical links and may be points of entry for incoming traffic, such as packets. Input component 555 may process incoming traffic, such as by performing data link layer encapsulation or decapsulation. In some implementations, input component 555 may send and/or receive packets. In some implementations, input component 555 may include an input line card that includes one or more packet processing components (e.g., in the form of integrated circuits), such as one or more interface cards (IFCs), packet forwarding components, line card controller components, input ports, processors, memories, and/or input queues. In some implementations, device 550 may include one or more input components 555.

Switching component 560 may interconnect input components 555 with output components 565. In some implementations, switching component 560 may be implemented via one or more crossbars, via busses, and/or with shared memories. The shared memories may act as temporary buffers to store packets from input components 555 before the packets are eventually scheduled for delivery to output components 565. In some implementations, switching component 560 may enable input components 555, output components 565, and/or controller 570 to communicate.

Output component 565 may store packets and may schedule packets for transmission on output physical links. Output component 565 may support data link layer encapsulation or decapsulation, and/or a variety of higher-level protocols. In some implementations, output component 565 may send packets and/or receive packets. In some implementations, output component 565 may include an output line card that includes one or more packet processing components (e.g., in the form of integrated circuits), such as one or more IFCs, packet forwarding components, line card controller components, output ports, processors, memories, and/or output queues. In some implementations, device 550 may include one or more output components 565. In some implementations, input component 555 and output component 565 may be implemented by the same set of components (e.g., an input/output component may be a combination of input component 555 and output component 565).

Controller 570 includes a processor in the form of, for example, a CPU, a GPU, an APU, a microprocessor, a microcontroller, a DSP, an FPGA, an ASIC, and/or another type of processor. The processor is implemented in hardware, firmware, and/or a combination of hardware and software. In some implementations, controller 570 may include one or more processors that can be programmed to perform a function.

In some implementations, controller 570 may include a RAM, a ROM, and/or another type of dynamic or static storage device (e.g., a flash memory, a magnetic memory, an optical memory, etc.) that stores information and/or instructions for use by controller 570.

In some implementations, controller 570 may communicate with other devices, networks, and/or systems connected to device 500 in order to exchange information regarding network topology. Controller 570 may create routing tables based on the network topology information, create forwarding tables based on the routing tables, and forward the forwarding tables to input components 555 and/or output components 565. Input components 555 and/or output components 565 may use the forwarding tables to perform route lookups for incoming and/or outgoing packets.

Controller 570 may perform one or more processes described herein. Controller 570 may perform these processes in response to executing software instructions stored by a non-transitory computer-readable medium.

Software instructions may be read into a memory and/or storage component associated with controller 570 from another computer-readable medium or from another device via a communication interface. When executed, software instructions stored in a memory and/or storage component associated with controller 570 may cause controller 570 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5B are provided as an example. In practice, device 550 may include additional components, fewer components, different components, or differently arranged components than those shown in FIG. 5B. Additionally, or alternatively, a set of components (e.g., one or more components) of device 550 may perform one or more functions described as being performed by another set of components of device 550.

Figure 6:
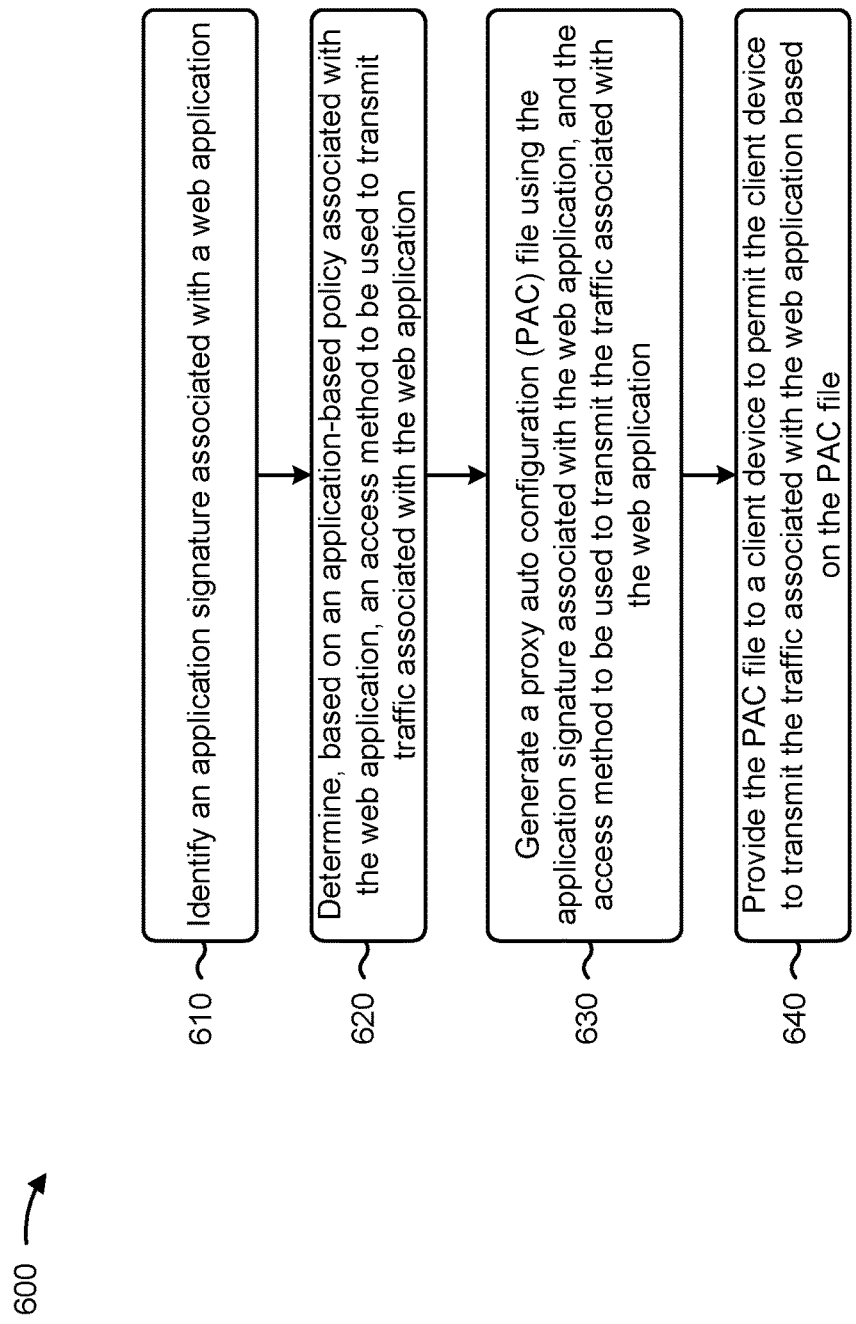
FIGS. 6-10 are flow charts of example processes for generating an application-based proxy auto configuration.

FIG. 6 is a flow chart of an example process 600 for generating an application-based proxy auto configuration. In some implementations, one or more process blocks of FIG. 6 may be performed by a network device (e.g., network device 430). In some implementations, one or more process blocks of FIG. 6 may be performed by another device or a group of devices separate from or including the network device, such as a client device (e.g., client device 410), a data store device (e.g., data store device 420), an application platform (e.g., application platform 440), a proxy server device (e.g., proxy server device 460), and/or the like.

As shown in FIG. 6, process 600 may include identifying an application signature associated with a web application (block 610). For example, the network device (e.g., using computing resource 444, processor 510, memory 515, storage component 520, communication interface 535, input component 555, switching component 560, output component 565, controller 570, and/or the like) may identify an application signature associated with a web application, as described above.

As further shown in FIG. 6, process 600 may include determining, based on an application-based policy associated with the web application, an access method to be used to transmit traffic associated with the web application (block 620). For example, the network device (e.g., using computing resource 444, processor 510, memory 515, storage component 520, communication interface 535, input component 555, switching component 560, output component 565, controller 570, and/or the like) may determine, based on an application-based policy associated with the web application, an access method to be used to transmit traffic associated with the web application, as described above.

As further shown in FIG. 6, process 600 may include generating a proxy auto configuration (PAC) file using the application signature associated with the web application, and the access method to be used to transmit the traffic associated with the web application (block 630). For example, the network device (e.g., using computing resource 444, processor 510, memory 515, storage component 520, controller 570, and/or the like) may generate a PAC file using the application signature associated with the web application, and the access method to be used to transmit the traffic associated with the web application, as described above.

As further shown in FIG. 6, process 600 may include providing the PAC file to a client device to permit the client device to transmit the traffic associated with the web application based on the PAC file (block 640). For example, the network device (e.g., using computing resource 444, processor 510, memory 515, storage component 520, communication interface 535, switching component 560, output component 565, controller 570, and/or the like) may provide the PAC file to a client device to permit the client device to transmit the traffic associated with the web application based on the PAC file, as described above.

Process 600 may include additional implementations, such as any single implementation or any combination of implementations described below and/or in connection with one or more other processes described elsewhere herein.

In some implementations, when identifying the application signature associated with the web application, the network device may identify the application signature based on information, associated with the web application, stored in an application signature store. In some implementations, when generating the PAC file, the network device may dynamically generate the PAC file based on an Internet protocol (IP) address and a port identifier, associated with the web application, identified in an application cache. In some implementations, the application-based policy, associated with the web application, may specify the access method to be used to transmit the traffic associated with the web application.

In some implementations, the traffic associated with the web application may be transmitted to an application server associated with the web application, via a deep packet inspection proxy server; the traffic associated with the web application may be transmitted to the application server associated with the web application, via an intrusion prevention system proxy server; or the traffic associated with the web application may be transmitted to the application server associated with the web application without using a proxy server.

In some implementations, when providing the PAC file to the client device, the network device may receive, from the client device, a request for the PAC file, and may provide, based on receiving the request, the PAC file to the client device. In some implementations, the network device may host the PAC file at a uniform resource identifier (URI) associated with the PAC file.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
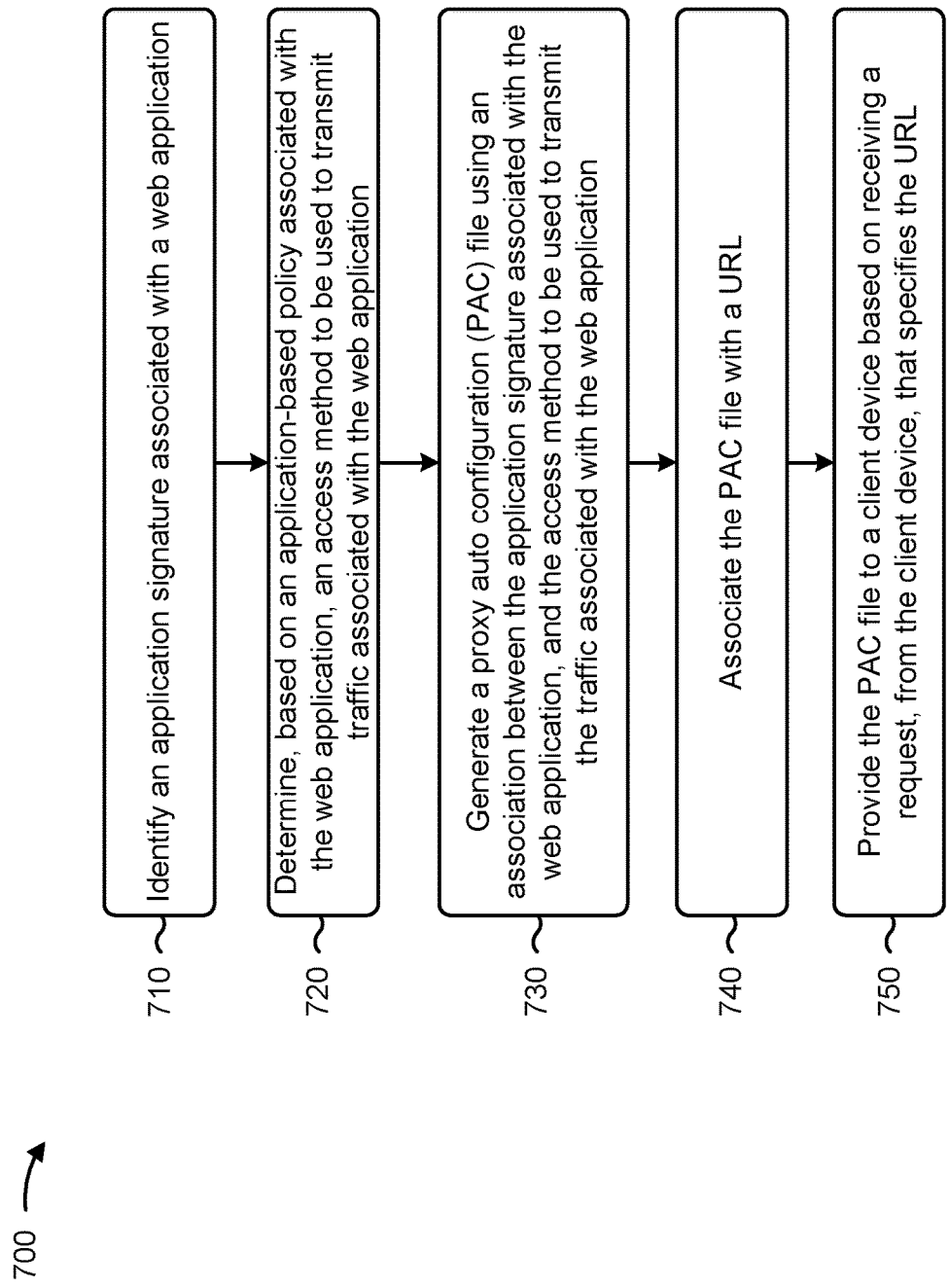

FIG. 7 is a flow chart of an example process 700 for generating an application-based proxy auto configuration. In some implementations, one or more process blocks of FIG. 7 may be performed by a network device (e.g., network device 430). In some implementations, one or more process blocks of FIG. 7 may be performed by another device or a group of devices separate from or including the network device, such as a client device (e.g., client device 410), a data store device (e.g., data store device 420), an application platform (e.g., application platform 440), a proxy server device (e.g., proxy server device 460), and/or the like.

As shown in FIG. 7, process 700 may include identifying an application signature associated with a web application (block 710). For example, the network device (e.g., using computing resource 444, processor 510, memory 515, storage component 520, communication interface 535, input component 555, switching component 560, output component 565, controller 570, and/or the like) may identify an application signature associated with a web application, as described above.

As further shown in FIG. 7, process 700 may include determining, based on an application-based policy associated with the web application, an access method to be used to transmit traffic associated with the web application (block 720). For example, the network device (e.g., using computing resource 444, processor 510, memory 515, storage component 520, communication interface 535, input component 555, switching component 560, output component 565, controller 570, and/or the like) may determine, based on an application-based policy associated with the web application, an access method to be used to transmit traffic associated with the web application, as described above.

As further shown in FIG. 7, process 700 may include generating a proxy auto configuration (PAC) file using the application signature associated with the web application, and the access method to be used to transmit the traffic associated with the web application (block 730). For example, the network device (e.g., using computing resource 444, processor 510, memory 515, storage component 520, controller 570, and/or the like) may generate a PAC file using the application signature associated with the web application, and the access method to be used to transmit the traffic associated with the web application, as described above.

As further shown in FIG. 7, process 700 may include associating the PAC file with a URL (block 740). For example, the network device (e.g., using computing resource 444, processor 510, memory 515, storage component 520, communication interface 535, input component 555, switching component 560, output component 565, controller 570, and/or the like) may associate the PAC file with a URL, as described above.

As further shown in FIG. 7, process 700 may include providing the PAC file to a client device based on receiving a request, from the client device, that specifies the network address (block 750). For example, the network device (e.g., using computing resource 444, processor 510, memory 515, storage component 520, communication interface 535, switching component 560, output component 565, controller 570, and/or the like) may provide the PAC file to a client device based on receiving a request, from the client device, that specifies the network address, as described above.

Process 700 may include additional implementations, including any single implementation or any combination of implementations described below and/or in connection with one or more other processes described elsewhere herein.

In some implementations, when generating the PAC file, the network device may dynamically generate the PAC file based on an Internet protocol (IP) address and a port identifier, associated with the web application, identified in an application cache. In some implementations, when dynamically generating the PAC file based on the IP address and the port identifier, associated with the web application, identified in the application cache, the network device may dynamically generate the PAC file based on determining that information identifying the IP address and a port identifier, associated with the web application, have been added to the application cache. In some implementations, when dynamically generating the PAC file, the network device may generate JavaScript code corresponding to an association between the IP address and the port identifier associated with the web application and the access method to be used to transmit the traffic associated with the web application.

In some implementations, when dynamically generating the PAC file based on the IP address and the port identifier, associated with the web application, identified in the application cache, the network device may determine whether a time interval, associated with the IP address and the port identifier identified in the application cache, has expired and may remove the IP address and the port identifier identified from the application cache based on determining that the time interval has expired.

In some implementations, the application signature comprises information identifying a user agent associated with the web application. In some implementations, information identifying the application signature associated with the web application may be stored in an application cache associated with the network device, and the application signature may include information identifying a host domain associated with the web application and information identifying an application protocol associated with the web application.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
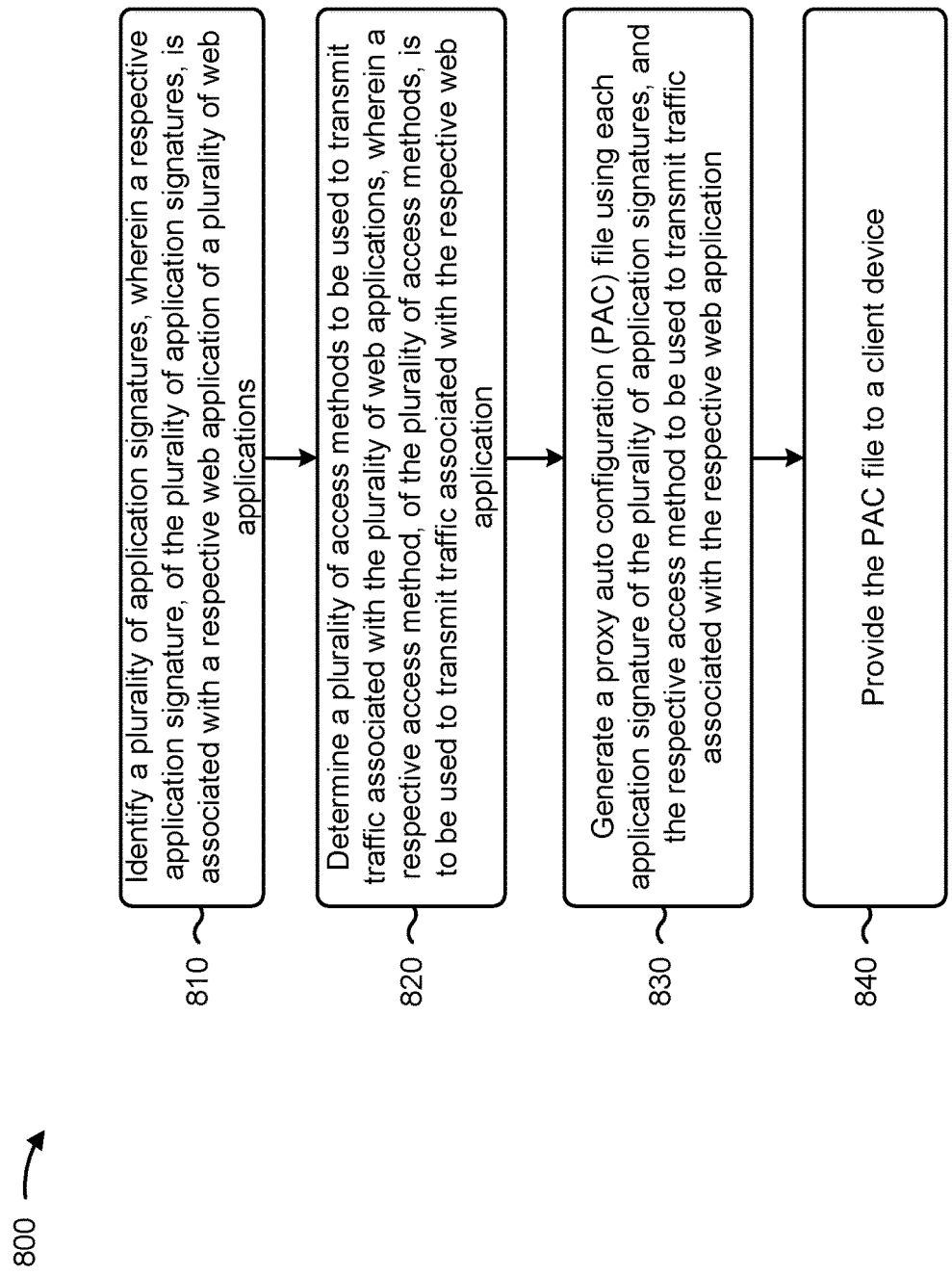

FIG. 8 is a flow chart of an example process 800 for generating an application-based proxy auto configuration. In some implementations, one or more process blocks of FIG. 8 may be performed by a network device (e.g., network device 430). In some implementations, one or more process blocks of FIG. 8 may be performed by another device or a group of devices separate from or including the network device, such as a client device (e.g., client device 410), a data store device (e.g., data store device 420), an application platform (e.g., application platform 440), a proxy server device (e.g., proxy server device 460), and/or the like.

As shown in FIG. 8, process 800 may include identifying a plurality of application signatures, wherein a respective application signature, of the plurality of application signatures, is associated with a respective web application of a plurality of web applications (block 810). For example, the network device (e.g., using computing resource 444, processor 510, memory 515, storage component 520, communication interface 535, input component 555, switching component 560, output component 565, controller 570, and/or the like) may identify a plurality of application signatures, as described above. In some implementations, a respective application signature, of the plurality of application signatures, may be associated with a respective web application of a plurality of web applications.

As further shown in FIG. 8, process 800 may include determining a plurality of access methods to be used to transmit traffic associated with the plurality of web applications, wherein a respective access method, of the plurality of access methods, is to be used to transmit traffic associated with the respective web application (block 820). For example, the network device (e.g., using computing resource 444, processor 510, memory 515, storage component 520, communication interface 535, input component 555, switching component 560, output component 565, controller 570, and/or the like) may determine a plurality of access methods to be used to transmit traffic associated with the plurality of web applications, as described above. In some implementations, a respective access method, of the plurality of access methods, may be used to transmit traffic associated with the respective web application.

As further shown in FIG. 8, process 800 may include generating a proxy auto configuration (PAC) file using each application signature of the plurality of application signatures, and the respective access method to be used to transmit traffic associated with the respective web application (block 830). For example, the network device (e.g., using computing resource 444, processor 510, memory 515, storage component 520, controller 570, and/or the like) may generate a PAC file using each application signature of the plurality of application signatures, and the respective access method to be used to transmit traffic associated with the respective web application, as described above.

As further shown in FIG. 8, process 800 may include providing the PAC file to a client device (block 840). For example, the network device (e.g., using computing resource 444, processor 510, memory 515, storage component 520, communication interface 535, switching component 560, output component 565, controller 570, and/or the like) may provide the PAC file to a client device, as described above.

Process 800 may include additional implementations, including any single implementation or any combination of implementations described below and/or in connection with one or more other processes described elsewhere herein.

In some implementations, a first web application, of the plurality of web applications, may be associated with a first web application type, a second web application, of the plurality of web applications, may be associated with a second web application type, and the first web application type and the second web application type may be different web application types.

In some implementations, each web application, of the plurality of web applications, may be associated with a different web application group type. In some implementations, when generating the PAC file, the network device may dynamically generate the PAC file based on an Internet protocol (IP) address and a port identifier, associated with the web application, identified in an application cache. In some implementations, when dynamically generating the PAC file, the network device may dynamically generate the PAC file based on determining that information identifying the IP address and a port identifier, associated with the web application, have been added to the application cache. In some implementations, when dynamically generating the PAC file, the network device may generate a JavaScript code corresponding to an association between the IP address and the port identifier associated with the web application and the access method to be used to transmit the traffic associated with the web application.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
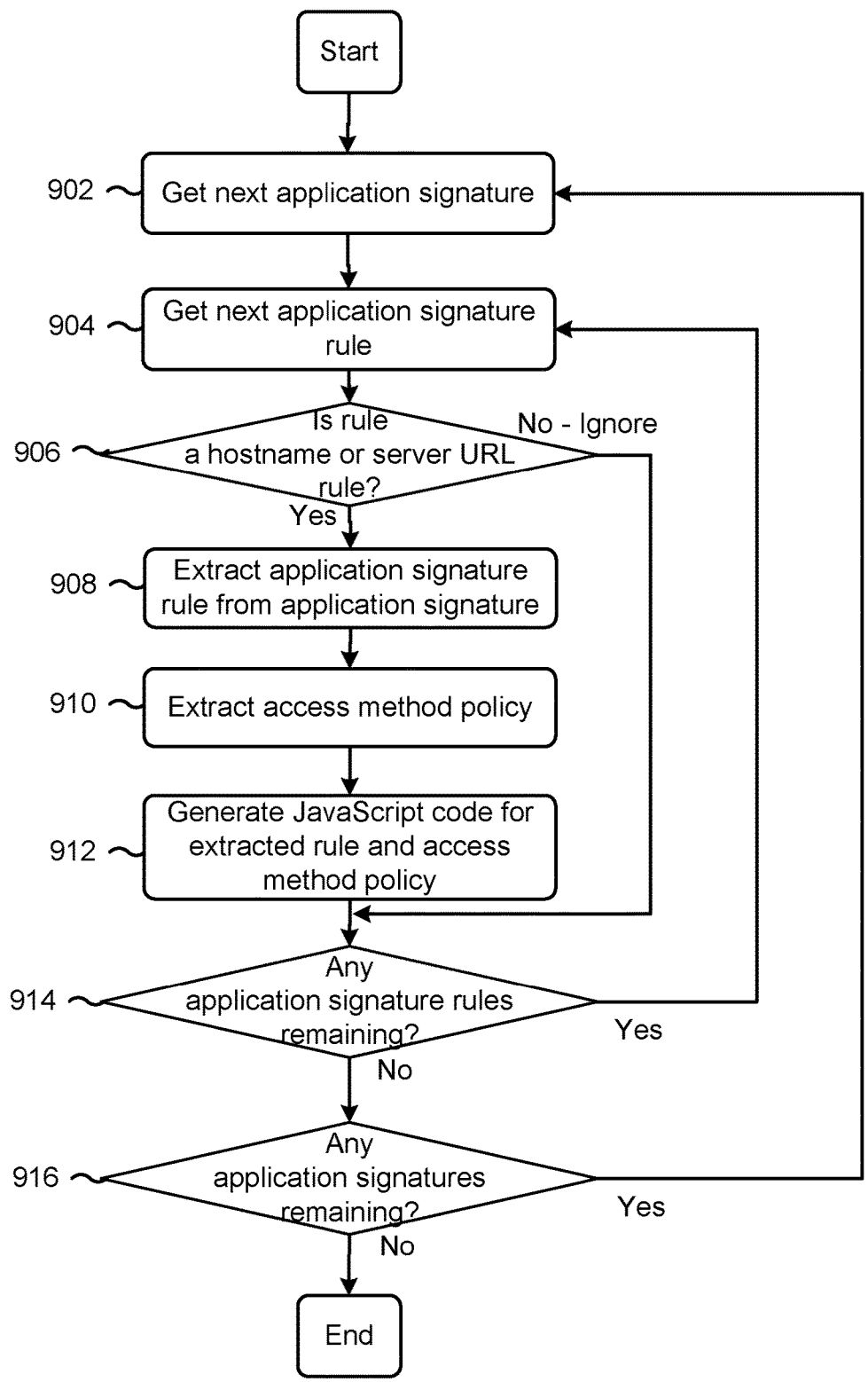

FIG. 9 is a flow chart of an example process 900 for statically generating an application-based proxy auto configuration. In some implementations, one or more process blocks of FIG. 9 may be performed by a network device (e.g., network device 430). In some implementations, one or more process blocks of FIG. 9 may be performed by another device or a group of devices separate from or including the network device, such as a client device (e.g., client device 410), a data store device (e.g., data store device 420), an application platform (e.g., application platform 440), a proxy server device (e.g., proxy server device 460), and/or the like.

As shown in FIG. 9, process 900 may include getting the next application signature, associated with a web application, from an application signature store (block 902). For example, the network device (e.g., using computing resource 444, processor 510, memory 515, storage component 520, communication interface 535, input component 555, switching component 560, output component 565, controller 570, and/or the like) may get the next application signature, associated with a web application, from an application signature store.

As further shown in FIG. 9, process 900 may include getting the next application signature rule from the application signature (block 904). For example, the network device (e.g., using computing resource 444, processor 510, memory 515, storage component 520, communication interface 535, input component 555, switching component 560, output component 565, controller 570, and/or the like) may get the next application signature rule from the application signature.

As further shown in FIG. 9, process 900 may include determining whether the application signature rule is a host-based pattern rule (block 906). For example, the network device (e.g., using computing resource 444, processor 510, memory 515, storage component 520, communication interface 535, switching component 560, output component 565, controller 570, and/or the like) may determine whether the application signature rule is a host-based pattern rule. If the application signature rule is not a host-based pattern rule (e.g., the application signature rule includes rules other than server hostname or server URL rules) (block 906-No), the network device may ignore the application signature rule and may return to block 904 to get next application signature rule from the application signature.

As further shown in FIG. 9, if the application signature rule has a pattern for server hostname or server URL (block 906—Yes), process 900 may include extracting the application signature rule from application signature (block 908). For example, the network device (e.g., using computing resource 444, processor 510, memory 515, storage component 520, communication interface 535, switching component 560, output component 565, controller 570, and/or the like) may extract the application signature rule from application signature.

As further shown in FIG. 9, process 900 may include extracting an access method policy, associated with the web application, from a security policy store (block 910). For example, the network device (e.g., using computing resource 444, processor 510, memory 515, storage component 520, communication interface 535, input component 555, switching component 560, output component 565, controller 570, and/or the like) may extract an access method policy, associated with the web application, from a security policy store.

As further shown in FIG. 9, process 900 may include generating JavaScript code for the extracted application signature rule and access method policy (block 912). For example, the network device (e.g., using computing resource 444, processor 510, memory 515, storage component 520, communication interface 535, input component 555, switching component 560, output component 565, controller 570, and/or the like) may generate JavaScript code for the extracted application signature rule and access method policy. In some implementations, the extract application signature rule may include a pattern for a server hostname (or server URL), and the generated JavaScript code may include a pattern similar to that illustrated in FIG. 3.

As further shown in FIG. 9, process 900 may include determining whether there are any remaining application signature rules in the application signature (block 914). For example, the network device (e.g., using computing resource 444, processor 510, memory 515, storage component 520, communication interface 535, input component 555, switching component 560, output component 565, controller 570, and/or the like) may determine whether there are any remaining application signature rules in the application signature. If the network device determines that there are remaining application signature rules in the application signature (block 914—Yes), process 900 may return to block 904 so that the next application signature rule may be extracted.

As further shown in FIG. 9, if the network device determines that there are no remaining application signature rules in the application signature (block 914—No), process 900 may include determining whether there are any remaining application signatures, included in the application signature store, to be processed (block 916). For example, the network device (e.g., using computing resource 444, processor 510, memory 515, storage component 520, communication interface 535, switching component 560, output component 565, controller 570, and/or the like) may determine whether there are any remaining application signatures, included in the application signature store, to be processed. If the network device determines that there are any remaining application signatures, included in the application signature store, to be processed (block 916—Yes), process 900 may return to block 902 so that the next application signature may be processed. If the network device determines that there are no remaining application signatures, included in the application signature store, to be processed (block 916—No), process 900 may end.

Process 900 may include additional implementations, such as any single implementation or any combination of implementations described below and/or in connection with one or more other processes described elsewhere herein. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
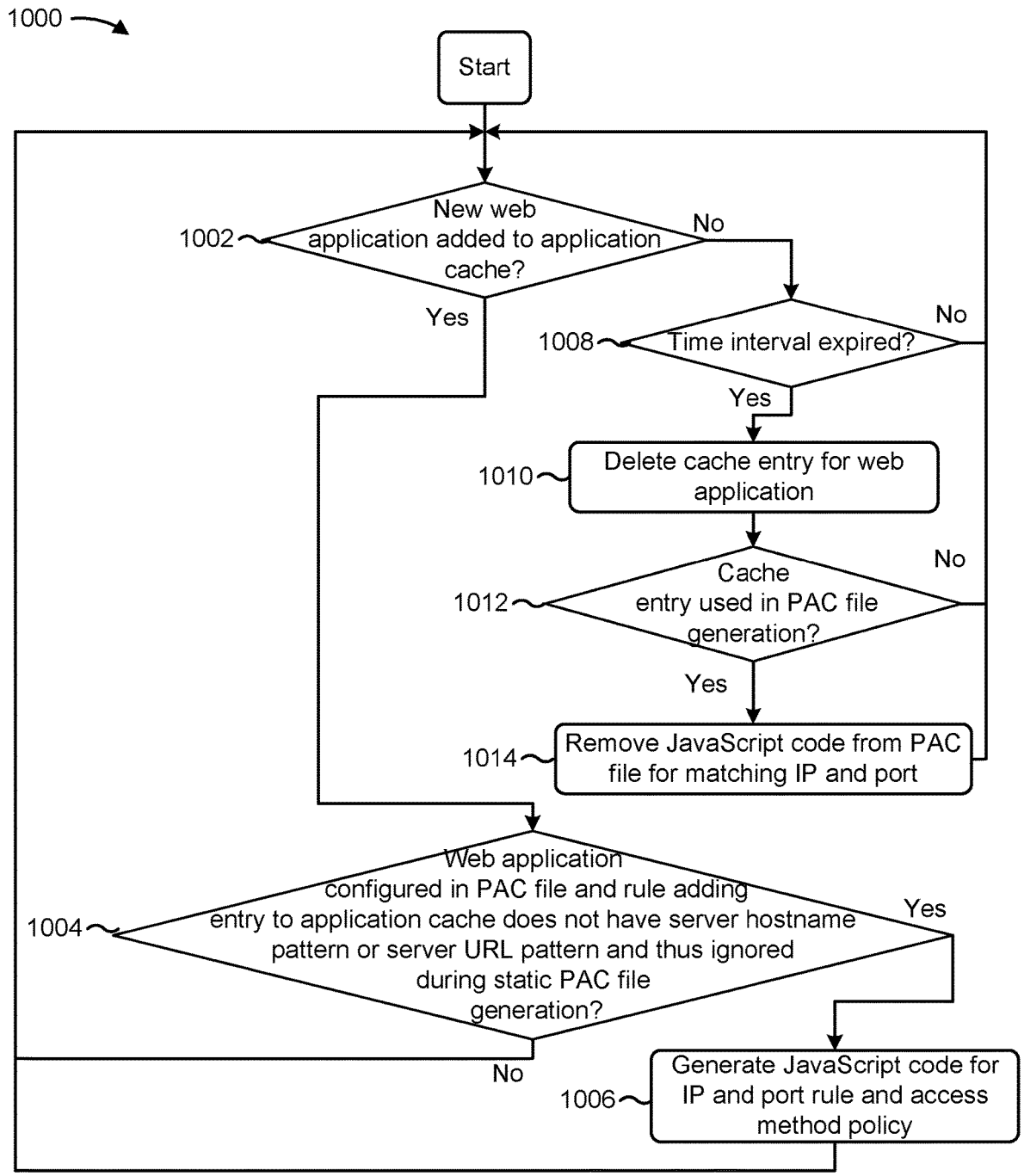

FIG. 10 is a flow chart of an example process 1000 for dynamically generating an application-based proxy auto configuration. In some implementations, one or more process blocks of FIG. 10 may be performed by a network device (e.g., network device 430). In some implementations, one or more process blocks of FIG. 10 may be performed by another device or a group of devices separate from or including the network device, such as a client device (e.g., client device 410), a data store device (e.g., data store device 420), an application platform (e.g., application platform 440), a proxy server device (e.g., proxy server device 460), and/or the like.

As shown in FIG. 10, process 1000 may include determining whether a web application is a new web application added to an application cache (block 1002). For example, the network device (e.g., using computing resource 444, processor 510, memory 515, storage component 520, communication interface 535, input component 555, switching component 560, output component 565, controller 570, and/or the like) may determine whether a web application is a new web application added to an application cache.

As further shown in FIG. 10, if the web application is a new web application added to the application cache (block 1002—Yes), process 1000 may include determining whether the web application configured in PAC file has a corresponding rule adding the entry to application cache does not have server hostname pattern or server URL pattern and was thus ignored during static PAC file generation (block 1004). For example, the network device (e.g., using computing resource 444, processor 510, memory 515, storage component 520, communication interface 535, input component 555, switching component 560, output component 565, controller 570, and/or the like) may determine whether the web application configured in PAC file has a corresponding rule adding the entry to application cache does not have server hostname pattern or server URL pattern and was thus ignored during static PAC file generation.

As further shown in FIG. 10, if the rule adding this entry in application cache does not correspond to one having server hostname or URL and was ignored during static PAC file generation (block 1004—Yes), process 1000 may include generating a JavaScript code for the IP address and port identifier rule associated with the web application, and an access method policy associated with the web application (block 1006). For example, the network device (e.g., using computing resource 444, processor 510, memory 515, stor-age component 520, controller 570, and/or the like) may generate a JavaScript code for the IP address and port identifier rule associated with the web application, and an access method policy associated with the web application.

As further shown in FIG. 10, if the web application is not a new web application added to the application cache (block 1002—No), process 1000 may include determining whether a time interval, associated with a cache entry of the web application in the application cache, has expired (block 1008). For example, the network device (e.g., using computing resource 444, processor 510, memory 515, storage component 520, communication interface 535, switching component 560, output component 565, controller 570, and/or the like) may determine whether a time interval, associated with a cache entry of the web application in the application cache, has expired.

As further shown in FIG. 10, if the time interval has expired, process 1000 may include deleting the cache entry, for the web application, from the application cache (block 1010). For example, the network device (e.g., using computing resource 444, processor 510, memory 515, storage component 520, communication interface 535, input component 555, switching component 560, output component 565, controller 570, and/or the like) may delete the cache entry, for the web application, from the application cache.

As further shown in FIG. 10, process 1000 may include determining whether the cache entry, for the web application, in the application cache was used to generate the PAC file (block 1012). For example, the network device (e.g., using computing resource 444, processor 510, memory 515, storage component 520, communication interface 535, input component 555, switching component 560, output component 565, controller 570, and/or the like) may determine whether the cache entry, for the web application, in the application cache was used to generate the PAC file.

As further shown in FIG. 10, if the cache entry, for the web application, in the application cache was used to generate the PAC file, process 1000 may include removing the JavaScript code, from PAC file, for the matching IP address and port identifier application signature rule (block 1014). For example, the network device (e.g., using computing resource 444, processor 510, memory 515, storage component 520, communication interface 535, input component 555, switching component 560, output component 565, controller 570, and/or the like) may remove the JavaScript code, from PAC file, for the matching IP address and port identifier application signature rule.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As used herein, "traffic" or "content" may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods, described herein, may be implemented in different forms of hardware, firmware, and/or a combination of hardware and software. The actual specialized control hardware or software code used to implement these systems and/or methods does not limit the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more memories; and
   one or more processors to:
   identify an application signature associated with a web application;
   determine, based on an application-based policy associated with the web application, an access method to be used to transmit traffic associated with the web application;
   generate a proxy auto configuration (PAC) file using:
      the application signature associated with the web application,
      the access method to be used to transmit the traffic associated with the web application, and
      wherein the one or more processors, when generating the PAC file, are to:
         dynamically generate the PAC file based on network endpoint information, associated with the web application, being added to a cache and identified in the cache; and
   provide the PAC file to a client device to permit the client device to transmit the traffic associated with the web application based on the PAC file.

2. The network device of claim 1, wherein the one or more processors, when identifying the application signature associated with the web application, are to:
   identify the application signature based on information, associated with the web application, stored in an application signature store.

3. The network device of claim 1, wherein the application-based policy, associated with the web application, specifies the access method to be used to transmit the traffic associated with the web application.

4. The network device of claim 1, wherein the access method specifies one of:
   the traffic associated with the web application is to be transmitted to an application server associated with the web application via a deep packet inspection proxy server,
   the traffic associated with the web application is to be transmitted to the application server associated with the web application via another proxy server, or
   the traffic associated with the web application is to be transmitted to the application server associated with the web application without using a proxy server.

5. The network device of claim 1, wherein the one or more processors, when providing the PAC file to the client device, are to:
   receive, from the client device, a request for the PAC file; and
   provide, based on receiving the request, the PAC file to the client device.

6. The network device of claim 1, wherein the one or more processors are further to:
   host the PAC file at a uniform resource locator (URL) associated with the PAC file.

7. The network device of claim 1, wherein the network endpoint information includes one or more of:
   a destination Internet protocol (IP) address,
   a port name,
   a port number,
   a port identifier,
   a protocol used by a network endpoint,
   a virtual router identifier associated with a network endpoint, or
   a rule from an application signature store that identified web application.

8. A non-transitory computer-readable medium storing instructions, the instructions comprising:
   one or more instructions that, when executed by one or more processors of a network device, cause the one or more processors to:
   identify an application signature associated with a web application;
   determine, based on an application-based policy associated with the web application, an access method to be used to transmit traffic associated with the web application;
   dynamically generate a proxy auto configuration (PAC) file using:
      the application signature associated with the web application,
      the access method to be used to transmit the traffic associated with the web application, and
      the one or more instructions, that cause the one or more processors to generate the PAC file, causing the one or more processors to:
         dynamically generate the PAC file based on network endpoint information, associated with the web application, being added to a cache and identified in the cache; and associate the PAC file with a uniform resource locator (URL); and provide the PAC file to a client device based on receiving a request, from the client device, that specifies the URL.

9. The non-transitory computer-readable medium of claim 8, wherein the one or more instructions, that cause the one or more processors to dynamically generate the PAC file, cause the one or more processors to:

generate JavaScript code corresponding to an association between an internet protocol (IP) address and a port identifier associated with the web application and the access method to be used to transmit the traffic associated with the web application.

10. The non-transitory computer-readable medium of claim 8, wherein the one or more instructions, that cause the one or more processors to dynamically generate the PAC file, cause the one or more processors to:

determine whether a time interval, associated with an IP address and a port identifier identified in the cache, has expired; and removing the IP address and the port identifier identified from the cache based on determining that the time interval has expired.

11. The non-transitory computer-readable medium of claim 8, wherein the application signature comprises:

information identifying a user agent associated with the web application.

12. The non-transitory computer-readable medium of claim 8, wherein information identifying the application signature associated with the web application is stored in an application signature store associated with the network device; and wherein the application signature comprises:

information identifying a host domain associated with the web application, and information identifying an application protocol associated with the web application.

13. The non-transitory computer-readable medium of claim 8, wherein the network endpoint information includes one or more of:

a destination Internet protocol (IP) address, a port name, a port number, a port identifier, a protocol used by a network endpoint, a virtual router identifier associated with a network endpoint, or a rule from an application signature store that identified web application.

14. The non-transitory computer-readable medium of claim 8, wherein the one or more instructions, that further cause the one or more processors to:

receive, from the client device, the request for the PAC file; and wherein the one or more instructions, that cause the one or more processors to provide the PAC file to the client device, cause the one or more processors to:

provide, based on receiving the request, the PAC file to the client device.

15. A method, comprising:

identifying, by a network device, a plurality of application signatures, wherein a respective application signature, of the plurality of application signatures, is associated with a respective web application of a plurality of web applications;

determining, by the network device, a plurality of access methods to be used to transmit traffic associated with the plurality of web applications, wherein a respective access method, of the plurality of access methods, is to be used to transmit traffic associated with the respective web application;

dynamically generating, by the network device, a proxy auto configuration (PAC) file based on network endpoint information, associated with the respective web application, identified in a cache, using:

each application signature of the plurality of application signatures, and the respective access method to be used to transmit traffic associated with the respective web application, generating, by the network device, code corresponding to an association based on the network endpoint information and the respective access method to be used to transmit the traffic associated with the respective web application; and providing, by the network device, the PAC file to a client device.

16. The method of claim 15, wherein a first web application, of the plurality of web applications, is associated with a first web application type;

wherein a second web application, of the plurality of web applications, is associated with a second web application type; and wherein the first web application type and the second web application type are different web application types.

17. The method of claim 15, wherein each web application, of the plurality of web applications, is associated with a different web application group type.

18. The method of claim 15, wherein generating the PAC file comprises:

dynamically generating the PAC file based on an Internet protocol (IP) address and a port identifier from the network endpoint information.

19. The method of claim 18, wherein dynamically generating the PAC file based on the IP address and the port identifier, associated with the respective web application, identified in an application cache comprises:

dynamically generating the PAC file based on determining that information identifying the IP address and the port identifier, associated with the respective web application, have been added to the application cache.

20. The method of claim 18, wherein the code comprises a JavaScript code corresponding to an association between the IP address and the port identifier associated with the respective web application and the respective access method to be used to transmit the traffic associated with the respective web application.

* * * * *